United States Patent
Losey

(10) Patent No.: US 10,052,834 B2
(45) Date of Patent: Aug. 21, 2018

(54) PROTECTIVE STRUCTURE FOR A RETREADED AIR MAINTENANCE TIRE

(71) Applicant: Robert Allen Losey, Kent, OH (US)

(72) Inventor: Robert Allen Losey, Kent, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 1002 days.

(21) Appl. No.: 13/652,497

(22) Filed: Oct. 16, 2012

(65) Prior Publication Data
US 2014/0102621 A1    Apr. 17, 2014

(51) Int. Cl.
*B29D 30/54* (2006.01)
*B29D 30/06* (2006.01)
*B29D 30/00* (2006.01)
*B60C 23/12* (2006.01)

(52) U.S. Cl.
CPC .............. *B29D 30/54* (2013.01); *B60C 23/12* (2013.01); *B29D 30/0061* (2013.01); *B29D 30/0662* (2013.01); *B29D 30/0681* (2013.01); *B29D 2030/0659* (2013.01); *Y10S 156/909* (2013.01); *Y10T 29/49492* (2015.01); *Y10T 29/49538* (2015.01)

(58) Field of Classification Search
CPC ...... B60C 23/12; B29D 30/54; B29D 30/542; B29D 30/56; B29D 30/0061; B29D 30/0662; B29D 30/0601; B29D 30/0654; B29D 30/0681; B29D 30/06; B29D 30/00; B29D 2030/0077; B29D 2030/0072; B29D 2030/0083; B29D 2030/0659; B29D 2030/587; Y10S 156/909; Y10T 29/49492; Y10T 29/49538

USPC .... 152/419; 156/323, 96, 909, 394.1, 421.2; 425/17, 23; 29/894.3, 894.37
See application file for complete search history.

(56) References Cited

U.S. PATENT DOCUMENTS 2,587,428 A * 2/1952 Antonson
3,492,180 A * 1/1970 Smith ................... B29D 30/54
156/96 X (Continued)

FOREIGN PATENT DOCUMENTS

CN    1111575    11/1995
EP    1762373 A2    3/2007

(Continued)

OTHER PUBLICATIONS

English machine translation of JP 2007-22043 A, Feb. 1, 2007.*

(Continued)

*Primary Examiner* — Adrienne C Johnstone
(74) *Attorney, Agent, or Firm* — Robert N. Lipcsik

(57) ABSTRACT

A method in accordance with the present invention retreads an air maintenance tire. The method comprises the steps of: grinding remaining tread material from a tire casing for a worn air-maintenance tire; temporarily securing a contoured piece around a structure secured to the inner surface of the tire casing; placing a tread on the tire casing; inflating a bladder within an internal cavity of the tire casing and around the contoured piece whereby the bladder does not contact the structure; securing the tread to the tire casing; deflating the bladder; separating the tire casing and tread secured to the tire casing from the bladder; and removing the contoured piece from the tire casing.

14 Claims, 32 Drawing Sheets

(56) References Cited

U.S. PATENT DOCUMENTS

| | | | |
|---|---|---|---|
| 3,847,631 A * | 11/1974 | MacMillan | B29D 30/54 156/96 |
| 4,022,554 A | 5/1977 | MacMillan | |
| 4,076,473 A | 2/1978 | MacMillan | |
| 4,169,497 A | 10/1979 | Tsuruta | |
| 4,258,776 A | 3/1981 | Walters et al. | |
| 4,782,878 A | 11/1988 | Mittal | |
| 6,244,104 B1 * | 6/2001 | Koch | |
| 6,267,084 B1 | 7/2001 | Louchart, III | |
| 8,047,243 B2 | 11/2011 | Simon et al. | |
| 8,656,972 B2 | 2/2014 | Hinque | |
| 2002/0079053 A1 * | 6/2002 | Tanaka | |
| 2003/0155054 A1 | 8/2003 | Bell | |
| 2004/0112495 A1 | 6/2004 | Weise | |
| 2006/0283534 A1 | 12/2006 | Hawes | |
| 2009/0044891 A1 | 2/2009 | Lee | |
| 2009/0084482 A1 * | 4/2009 | Majumdar | B29D 30/0061 |
| 2009/0159165 A1 | 6/2009 | Herberger, Sr. et al. | |
| 2009/0159172 A1 * | 6/2009 | Tanno | B29D 30/0061 |
| 2009/0294006 A1 | 12/2009 | Hrabal | |
| 2010/0212791 A1 * | 8/2010 | Incavo | |
| 2010/0243121 A1 * | 9/2010 | Eigenbrode | B60C 23/12 152/419 |
| 2011/0272073 A1 | 11/2011 | Losey | |
| 2011/0308704 A1 | 12/2011 | Sandstrom | |
| 2012/0160386 A1 * | 6/2012 | Hinque | B60C 23/12 |
| 2012/0211137 A1 | 8/2012 | Hrabal | |

FOREIGN PATENT DOCUMENTS

| | | |
|---|---|---|
| EP | 2223814 A1 | 9/2010 |
| EP | 2338703 A2 | 6/2011 |
| EP | 2397314 A1 | 12/2011 |
| EP | 2502761 A1 | 9/2012 |
| GB | 959680 A | 6/1964 |
| JP | 2007022043 A | 2/2007 |
| JP | 2012000989 A | 1/2012 |
| WO | WO9807562 A1 | 2/1998 |
| WO | 2010/110905 | 9/2010 |

OTHER PUBLICATIONS

EPO Search Report dated Jan. 21, 2014.
Chinese Search Report for Application Serial No. 201310483518.0 dated Aug. 18, 2015.

* cited by examiner

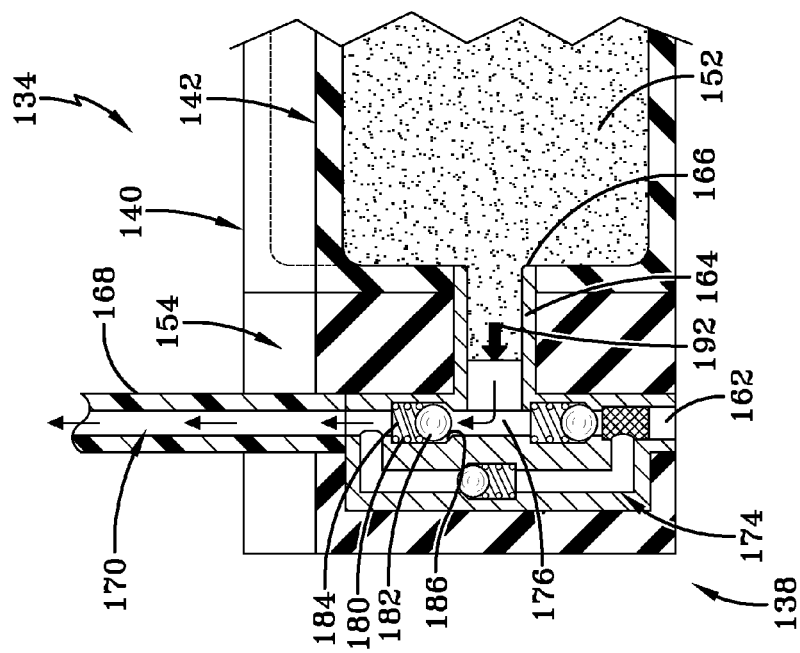
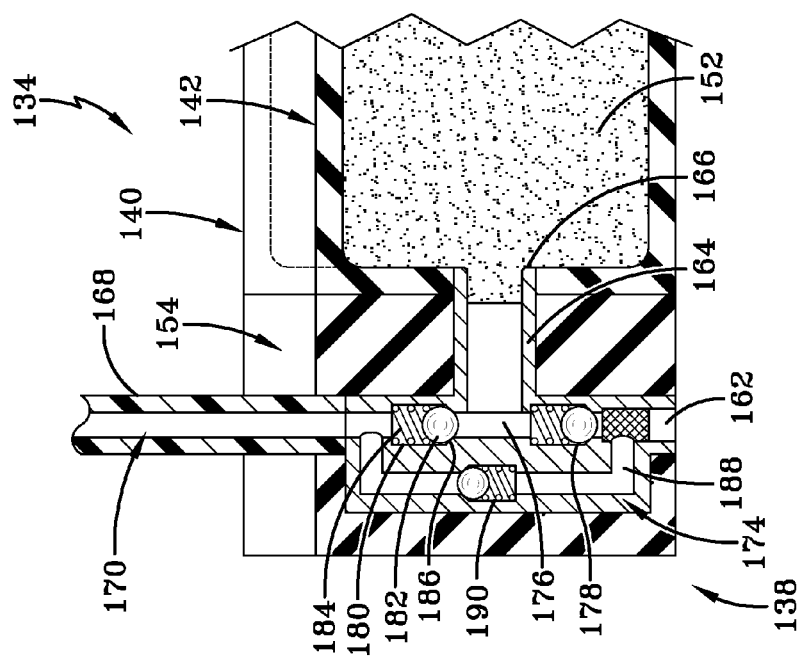

FIG-17A

PROTECTIVE STRUCTURE FOR A RETREADED AIR MAINTENANCE TIRE

FIELD OF THE INVENTION

The present invention relates generally to air maintenance tires and, more specifically, to a retreaded air maintenance tire having a protective structure for an integrated air pumping system.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life, and reduced vehicle braking and handling performance. Tire Pressure Monitoring Systems (TPMS) have been proposed to warn drivers when tire pressure is significantly low. Such systems, however, remain dependant upon the driver taking remedial action when warned to re-inflate a tire to a recommended pressure. It is a desirable, therefore, to incorporate an air maintenance feature within a tire, particularly a retreadable truck tire, that will auto-maintain air pressure within the tire.

SUMMARY OF THE INVENTION

A method in accordance with the present invention retreads an air maintenance tire. The method comprises the steps of: grinding remaining tread material from a tire casing for a worn air-maintenance tire; temporarily securing a contoured piece around a structure secured to the inner surface of the tire casing; placing a tread on the tire casing; inflating a bladder within an internal cavity of the tire casing and around the contoured piece whereby the bladder does not contact the structure; securing the tread to the tire casing; deflating the bladder; separating the tire casing and tread secured to the tire casing from the bladder; and removing the contoured piece from the tire casing.

According to another aspect of the method, the contoured piece is constructed from a heat insulating material.

According to still another aspect of the method, the contoured piece is constructed from a foamed material.

According to yet another aspect of the method, the contoured piece is constructed from polystyrene foam.

According to still another aspect of the method, the internal cavity is defined by an innerliner of the tire casing and the structure is secured to the innerliner.

According to yet another aspect of the method, the structure includes a compression actuator means or pressure regulator mounted to the tire casing and being operatively actuated by deformation of the retreaded tire casing.

According to still another aspect of the method, the structure includes a pump assembly affixed to the tire casing.

According to yet another aspect of the method, the structure includes a compressor body affixed to the tire casing, the compressor body or pressure regulator body including an internal air chamber with an inlet opening for admitting air into the internal air chamber and an outlet opening for conducting air from the internal air chamber to the internal cavity of the tire casing.

According to still another aspect of the method, the structure includes a flexible membrane member located within an air chamber and operatively deforming within the air chamber responsive to contacting engagement with a compression actuator means or pressure regulator between an open position relative to an inlet opening permitting air flow from the inlet opening into the air chamber and a closed position relative to the inlet opening obstructing air flow from the inlet opening into the air chamber.

According to yet another aspect of the method, the structure includes a membrane member operatively deforming between an open position and a closed position thereby compressing a volume of air within an air chamber.

A system retreads an air-maintenance tire. The system includes a tire casing, a contoured piece, a retread element, and a bladder. The tire casing is a worn air-maintenance tire. The tire casing has remaining tread material ground off the tire casing. The contoured piece temporarily is secured around an air-maintenance structure secured to the inner surface of the tire casing. The retread element is placed on the ground tire casing. The bladder is inflated within an internal cavity of the tire casing and around the contoured piece whereby the bladder does not contact the structure. The bladder provides heat for securing the retread element to the tire casing. The bladder is subsequently deflated and separated from the tire casing and the contoured piece is removed from the tire casing.

According to another aspect of the system, the contoured piece is constructed from a heat insulating material.

According to still another aspect of the system, the contoured piece is constructed from an aramid material.

According to yet another aspect of the system, the contoured piece is constructed from polystyrene foam.

According to still another aspect of the system, the internal cavity is defined by an innerliner of the tire casing and the structure is secured to the innerliner.

According to yet another aspect of the system, the structure includes a compression actuator means or pressure regulator mounted to the tire casing and being operatively actuated by deformation of the retreaded tire casing.

According to still another aspect of the system, the structure includes a pump assembly affixed to the tire casing.

According to yet another aspect of the system, the structure includes a compressor body or pressure regulator body affixed to the tire casing. The compressor body includes an internal air chamber with an inlet opening for admitting air into the internal air chamber and an outlet opening for conducting air from the internal air chamber to the internal cavity of the tire casing.

According to still another aspect of the system, the structure includes a flexible membrane member located within an air chamber and operatively deforming within the air chamber responsive to contacting engagement with a compression actuator means or pressure regulator between an open position relative to an inlet opening permitting air flow from the inlet opening into the air chamber and a closed position relative to the inlet opening obstructing air flow from the inlet opening into the air chamber.

According to yet another aspect of the system, the structure includes a membrane member operatively deforming between an open position and a closed position thereby compressing a volume of air within an air chamber.

An air-maintenance tire system for use with the present invention may comprise an outlet valve member within the air chamber and moving along the air chamber responsive to air pressure within the air chamber reaching a preset threshold between an open position wherein permitting air flow from the air chamber into the outlet opening and a closed position wherein obstructing air flow from the air chamber into the outlet opening.

According to another aspect of the air-maintenance tire system, a membrane valve member and the outlet valve member are positioned at opposite ends of the air chamber.

According to still another aspect of the air-maintenance tire system, an inlet conduit extends through the tire between the inlet opening and an outward facing side of the tire.

According to yet another aspect of the air-maintenance tire system, an outlet conduit extends from the outlet opening to the tire cavity.

According to still another aspect of the air-maintenance tire system, the compression actuator means or pressure regulator includes a hollow containment body formed from a resilient deformable material composition and containing a quantity of a non-compressible medium, the containment body affixed to a relatively high flex-deformation region of the tire carcass and the containment body reciprocally transforming between a deformed state and a non-deformed state responsive to deformation and recovery of the tire high flex-deformation region in a rolling tire, respectively; and wherein the actuator means containment body in the deformed state displacing a pressurized displaced quantity of the non-compressible medium, the pressurized displaced quantity of the non-compressible medium operative to generate a compression force against a membrane valve member surface to move the membrane valve between the open and closed positions within the air chamber.

According to yet another aspect of the air-maintenance tire system, the containment body operationally undergoes a cyclic transformation between the deformed state and the non-deformed state during a tire revolution against a ground surface.

According another air-maintenance tire system for use with the present invention, an air-maintenance tire system includes a tire cavity defined by an innerliner, first and second sidewalls extending respectively from first and second tire bead regions, respectively, to a tire tread region.

According to another aspect of the other air-maintenance tire system, a compression actuator means mounted to a tire carcass configured for operative actuation by tire deformation during a tire revolution, a pump assembly affixed to the tire carcass and comprising a compressor body affixed to the compression actuator means and having an internal air chamber, the air chamber having an inlet opening for admitting air into the internal air chamber and an outlet opening for conducting air from the internal air chamber to the tire cavity, the air compressor body further including a membrane valve member and an outlet valve member located within and at opposite respective ends of the internal air chamber, the membrane valve member and the outlet valve member moving within the internal air chamber responsive to actuation by the compression actuator means between respective open and closed positions, whereby cyclically opening and closing the inlet and the outlet openings during an air compression cycle includes air intake, air compression, and air discharge within the air chamber.

According to still another aspect of the other air-maintenance tire system, the membrane valve member in the open position relative to the inlet opening permitting air flow from the inlet opening into the air chamber and the piston valve member in the closed position relative to the inlet opening obstructing air flow from the inlet opening into the air chamber, and wherein the membrane valve member during movement between the open and closed positions operatively compressing a volume of air within the air chamber.

According to yet another aspect of the other air-maintenance tire system, the outlet valve member in the closed position relative to the outlet opening is operative to move to the open position responsive to air pressure within the air chamber reaching a preset threshold wherein permitting air flow from the air chamber into the outlet opening.

According to still another aspect of the other air-maintenance tire system, an inlet conduit extends through the tire between the inlet opening and an outward facing side of the tire.

According to yet another aspect of the other air-maintenance tire system, an outlet conduit extends from the outlet opening to the tire cavity.

According to still another aspect of the other air-maintenance tire system, the compression actuator means or pressure regulator includes a hollow containment body formed from a resilient deformable material composition and containing a quantity of a non-compressible medium, the containment body affixed to a relatively high flex-deformation region of the tire carcass and the containment body reciprocally transforming between a deformed state and a non-deformed state responsive to deformation and recovery of the tire high flex-deformation region in a rolling tire, respectively; and wherein the actuator means containment body in the deformed state displacing a pressurized displaced quantity of the non-compressible medium, the pressurized displaced quantity of the non-compressible medium operative to generate a deformation force against a membrane valve member surface to deform the membrane valve member between the open and closed positions within the air chamber.

According to yet another aspect of the other air-maintenance tire system, the containment body operationally undergoes a cyclic transformation between the deformed state and the non-deformed state during a tire revolution against a ground surface.

According to still another air-maintenance tire system for use with the present invention, a tire has a tire carcass comprising a tire cavity defined by an innerliner, first and second sidewalls extending respectively from first and second tire bead regions to a tire tread region.

According to another aspect of the still other air-maintenance tire system, a compression actuator means is mounted to the tire carcass configured for operative actuation by tire deformation during a tire revolution.

According to still another aspect of the still other air-maintenance tire system, a pump assembly is affixed to the tire carcass and includes a compressor body affixed to the compression actuator means and having an internal air chamber, the internal air chamber having an inlet opening for admitting air into the internal air chamber and an outlet opening for conducting air from the internal air chamber to the tire cavity; the air compressor body further comprising a membrane valve member deforming into a deformed state within the internal air chamber responsive to actuation by the compression actuator means to compress air within the internal air chamber.

According to yet another aspect of the still other air-maintenance tire system, an outlet valve member is located within the internal air chamber, the outlet valve member operatively moving relative to the internal air chamber between an open position permitting a flow of compressed air from the internal air chamber into the outlet opening and a closed position obstructing a flow of compressed air from the internal air chamber into the outlet opening.

According to still another aspect of the still other air-maintenance tire system, the outlet valve member comprises a plug member operatively fitting within the outlet opening in the closed outlet valve member position and the plug member operatively dislodging from within the outlet opening in the open outlet valve member position.

According to yet another aspect of the still other air-maintenance tire system, the compression actuator means comprising a hollow containment body formed from a resilient deformable material composition and containing a quantity of a non-compressible medium, the containment body affixed to a relatively high flex-deformation region of the tire carcass and the containment body reciprocally transforming between a deformed state and a non-deformed state responsive to deformation and recovery of the tire high flex-deformation region in a rolling tire, respectively; and wherein the actuator means containment body in the deformed state displacing a pressurized displaced quantity of the non-compressible medium against the membrane valve member to operatively place the membrane valve member in the deformed state.

According to still another aspect of the still other air-maintenance tire system, the compression actuator means includes a hollow containment body formed from a resilient deformable material composition and containing a quantity of a non-compressible medium, the containment body affixed to a relatively high flex-deformation region of the tire carcass and the containment body reciprocally transforming between a deformed state and a non-deformed state responsive to deformation and recovery of the tire high flex-deformation region in a rolling tire, respectively; and wherein the actuator means containment body in the deformed state displacing a pressurized displaced quantity of the non-compressible medium against the membrane valve member to operatively place the membrane valve member in the deformed state.

According to yet another aspect of the still other air-maintenance tire system, the containment body operationally undergoes a cyclic transformation between the deformed state and the non-deformed state during a tire revolution against a ground surface.

Definitions

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tire wall that may extend circumferentially or laterally about the tire wall. The "groove width" is equal to its average width over its length. A groove is sized to accommodate an air tube as described.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The present invention will be described by way of example and with reference to the accompanying drawings, in which:

FIG. 13A is a sectioned view taken from 13A-13A of FIG. 11B with the pump shown at rest.

FIG. 13B is a sectioned view taken from 13B-13B of FIG. 12B, with a viscoelastic material filling the chamber and pushing air through a second one-way valve into the tire cavity.

FIG. 17A is an enlarged section view of the membrane pump taken from FIG. 16 showing the pump at rest with outside air entering the inlet chamber.

DETAILED DESCRIPTION OF EXAMPLES OF THE PRESENT INVENTION

Figure 1:
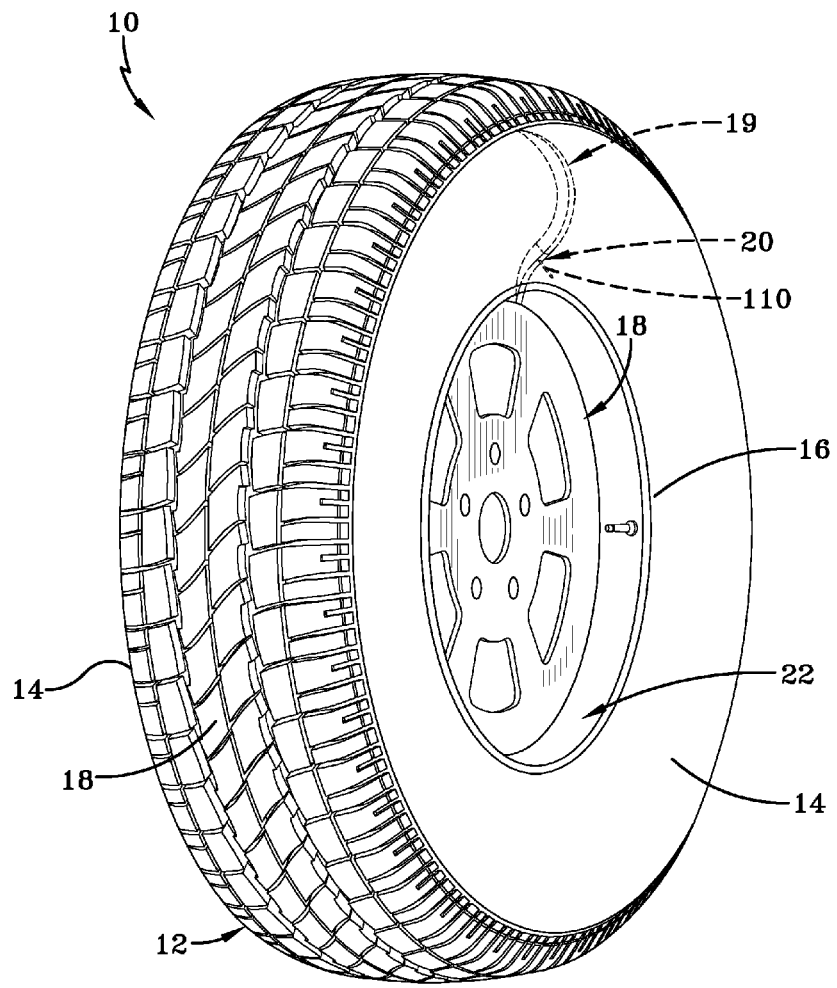
FIG. 1 is a perspective view of a tire system showing a pump location.
Figure 2A:
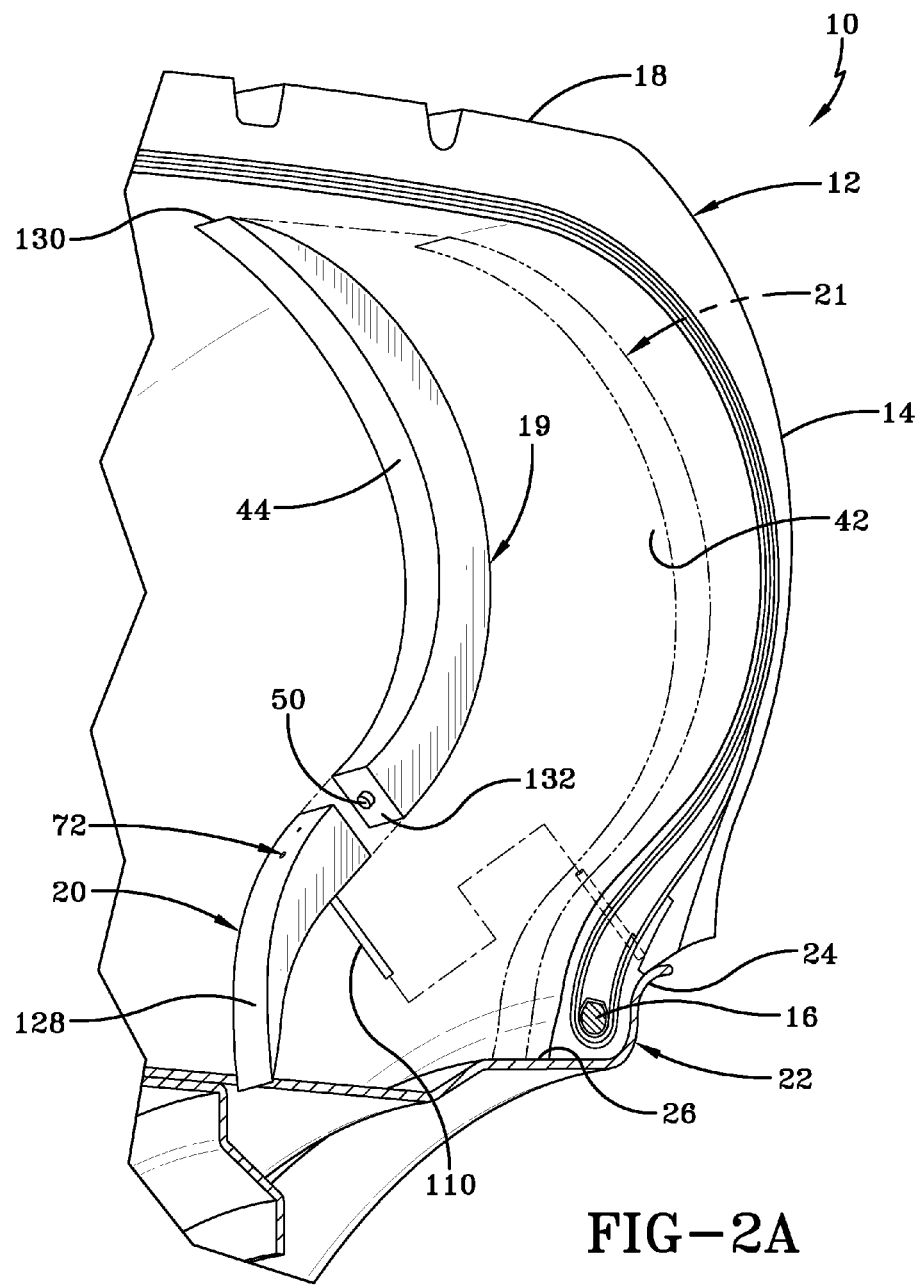
FIG. 2A is a perspective cut away of the tire system showing a 2-part pump before assembly, and the phantom box shown to illustrate the glue area on an inner wall.
Figure 2B:
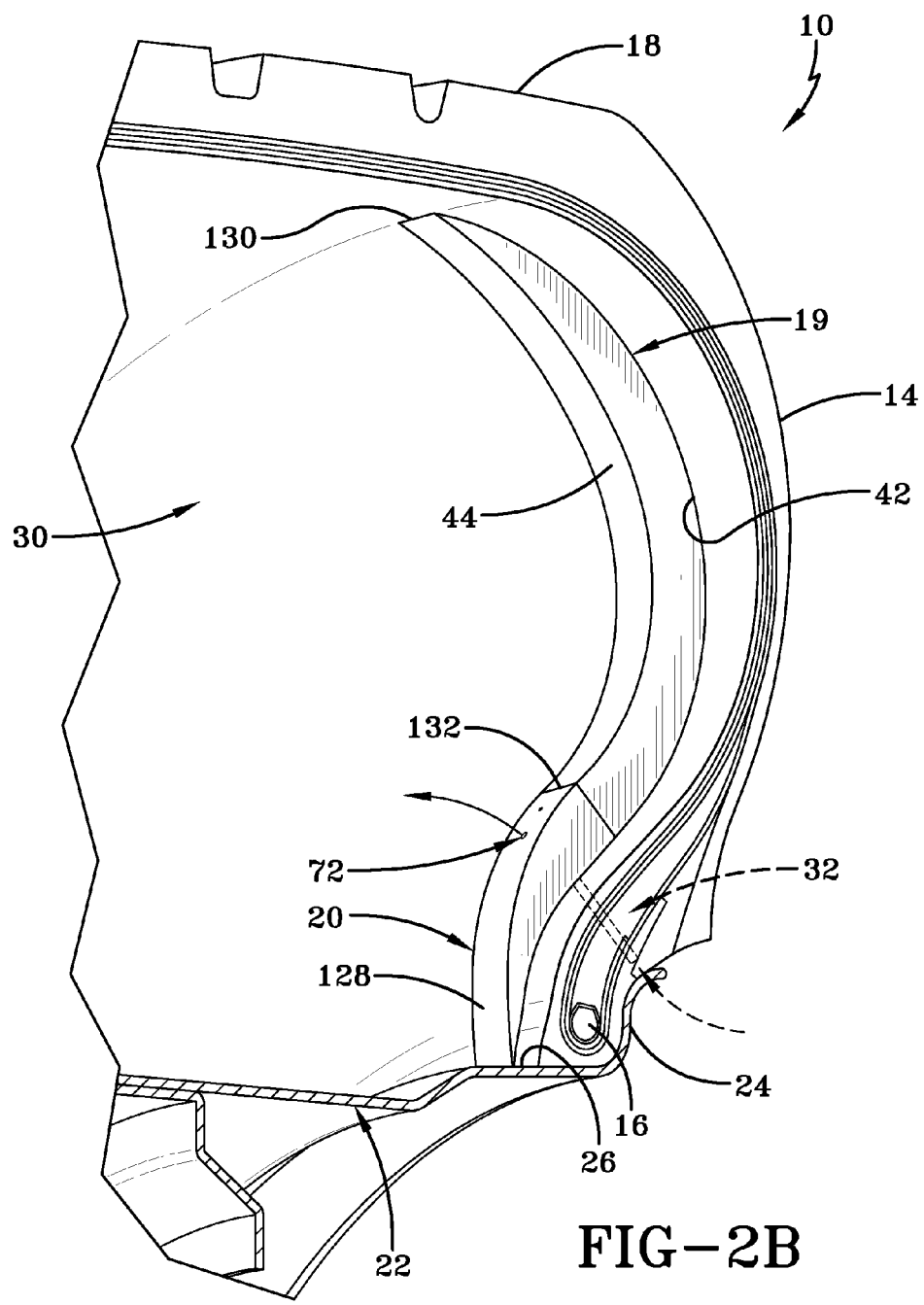
FIG. 2B is a perspective cut away of tire showing a 2-part pump assembled with a tube inserted through a tire wall.

Referring to FIGS. 1, 2A, 2B, 3A, 3B, and 4, an example Self-Inflating Tire System (SITS), or Air Maintenance Tire (AMT) system, 10 is shown to include a tire 12 with a carcass ply of generally conventional construction having a pair of sidewalls 14, a pair of beads 16, and a tread 18. The tire 12 is configured to be self-inflating by inclusion of a pump assembly 20 and coupled compression actuator assembly 19, or pressure regulator, both of which being attached to the tire in a post-cure assembly procedure. As shown in FIG. 2A, the pressure regulator or assembly 19 may be mounted to a sidewall 14 by application of adhesive as shown in phantom as adhesive area 21. The tire 12 mounts conventionally to a rim 22 having a tire mounting surface 26 and an outer rim flange 24 extending from surface 26. The tire 12 is further formed to provide an inner liner component 28 which defines and encloses an internal tire air cavity 30. Adhesive is applied to the sidewall region of the inner liner 28 as depicted by area 21. The tire 12 is formed to further provide a lower sidewall region 32 proximate to the bead areas 16 of the tire.

Figure 3A:
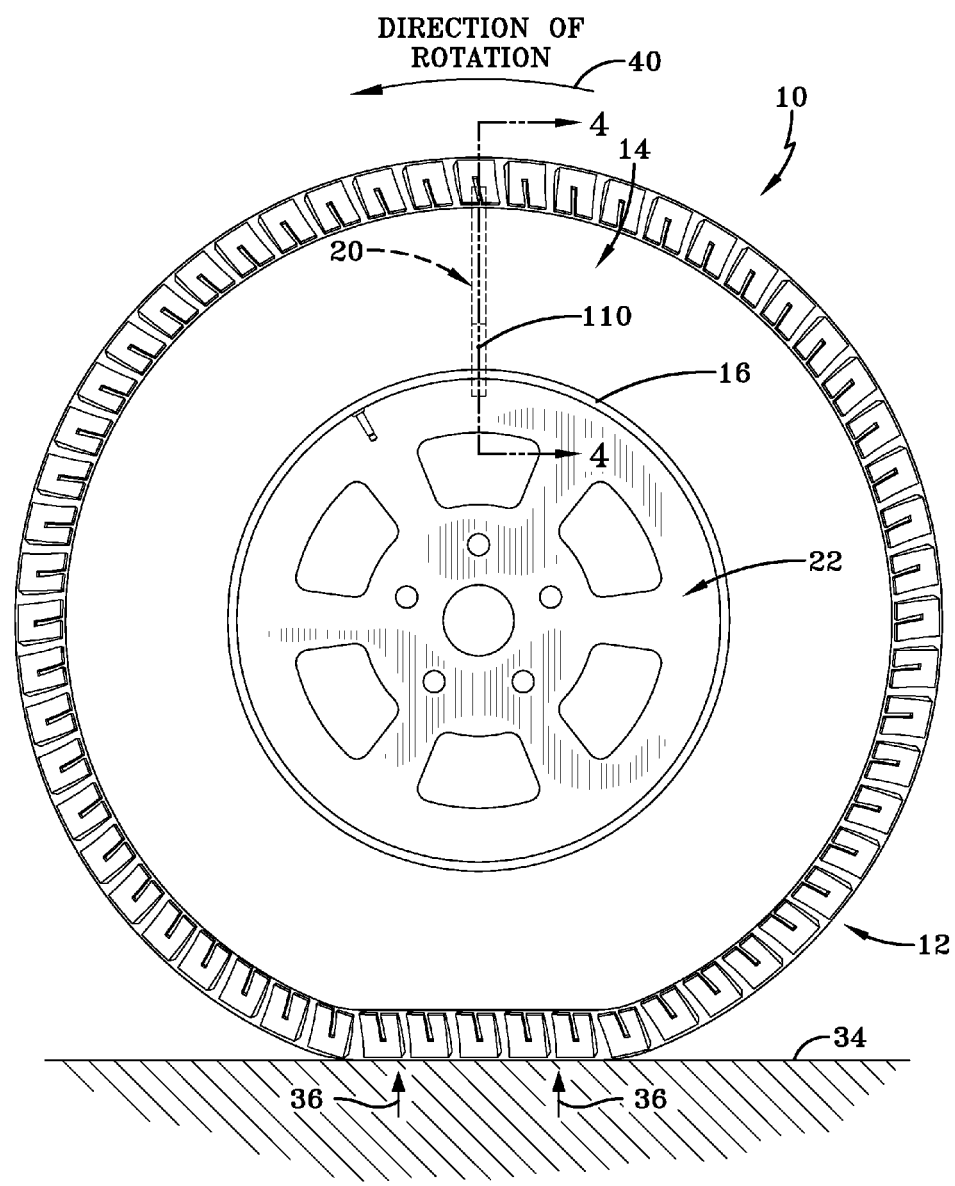
FIG. 3A is a side view showing a pump location in a non-compressed area of the tire.
Figure 3B:
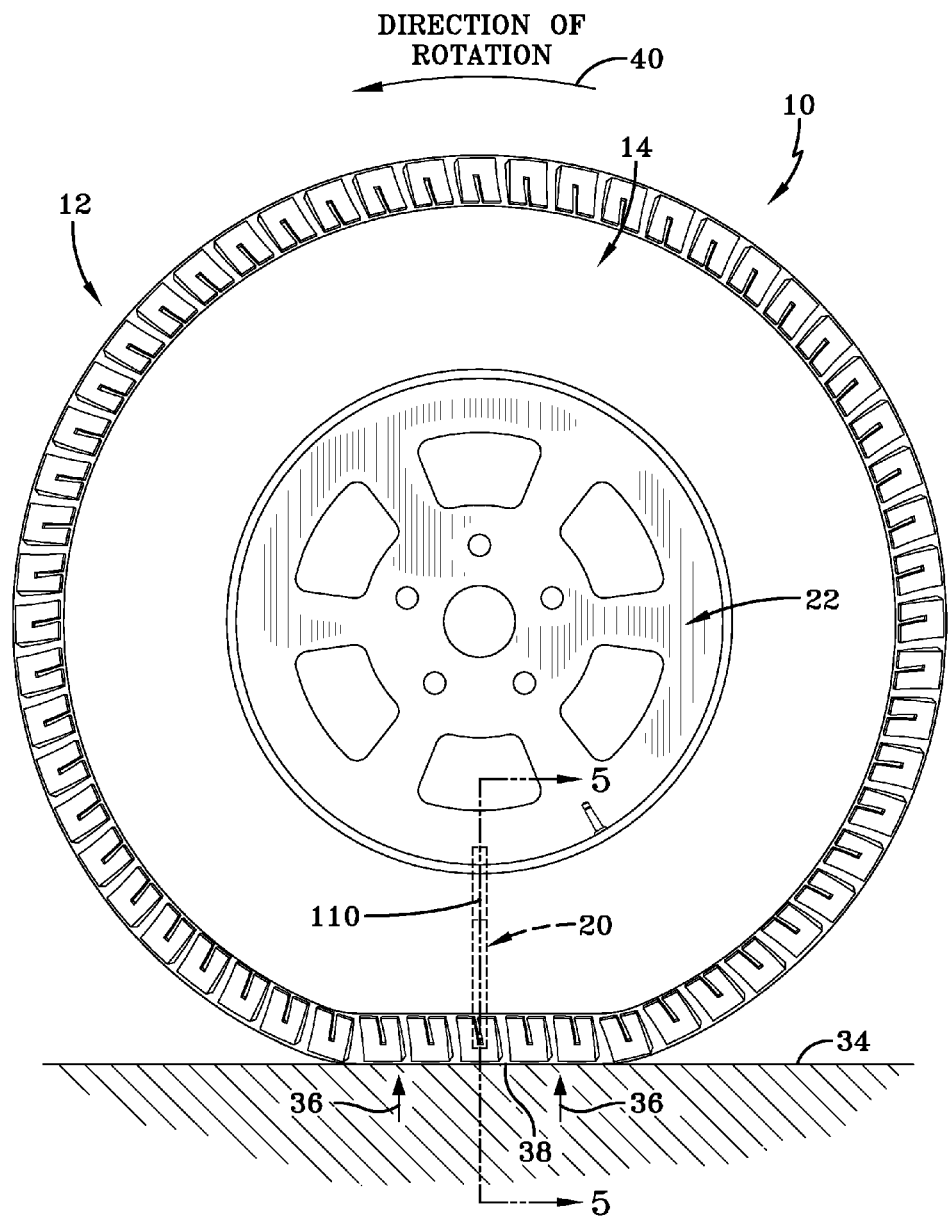
FIG. 3B is a side view showing a pump location in a compressed area of the tire.
Figure 4:
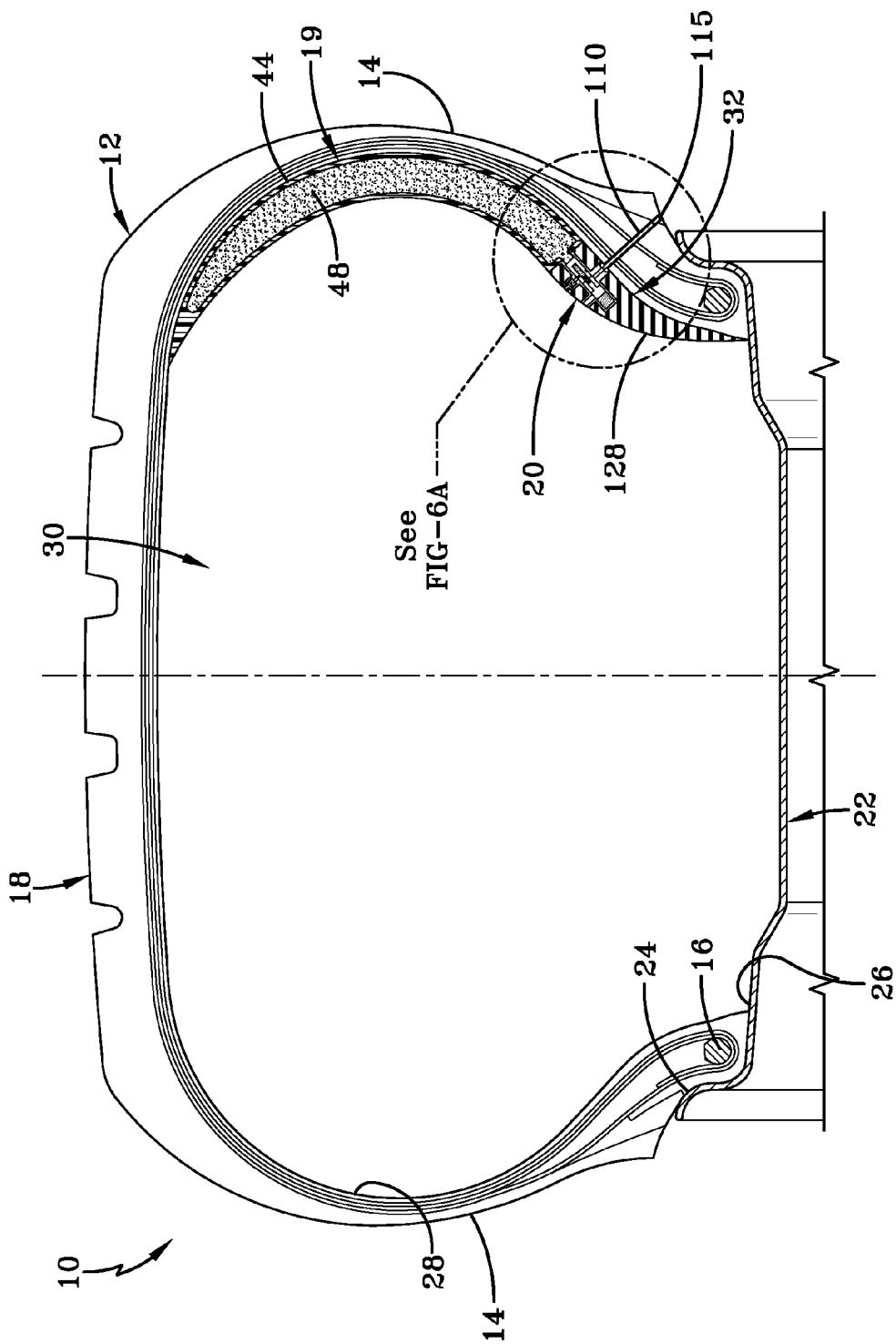
FIG. 4 is a sectioned view taken from 4-4 of FIG. 3A.
Figure 5:
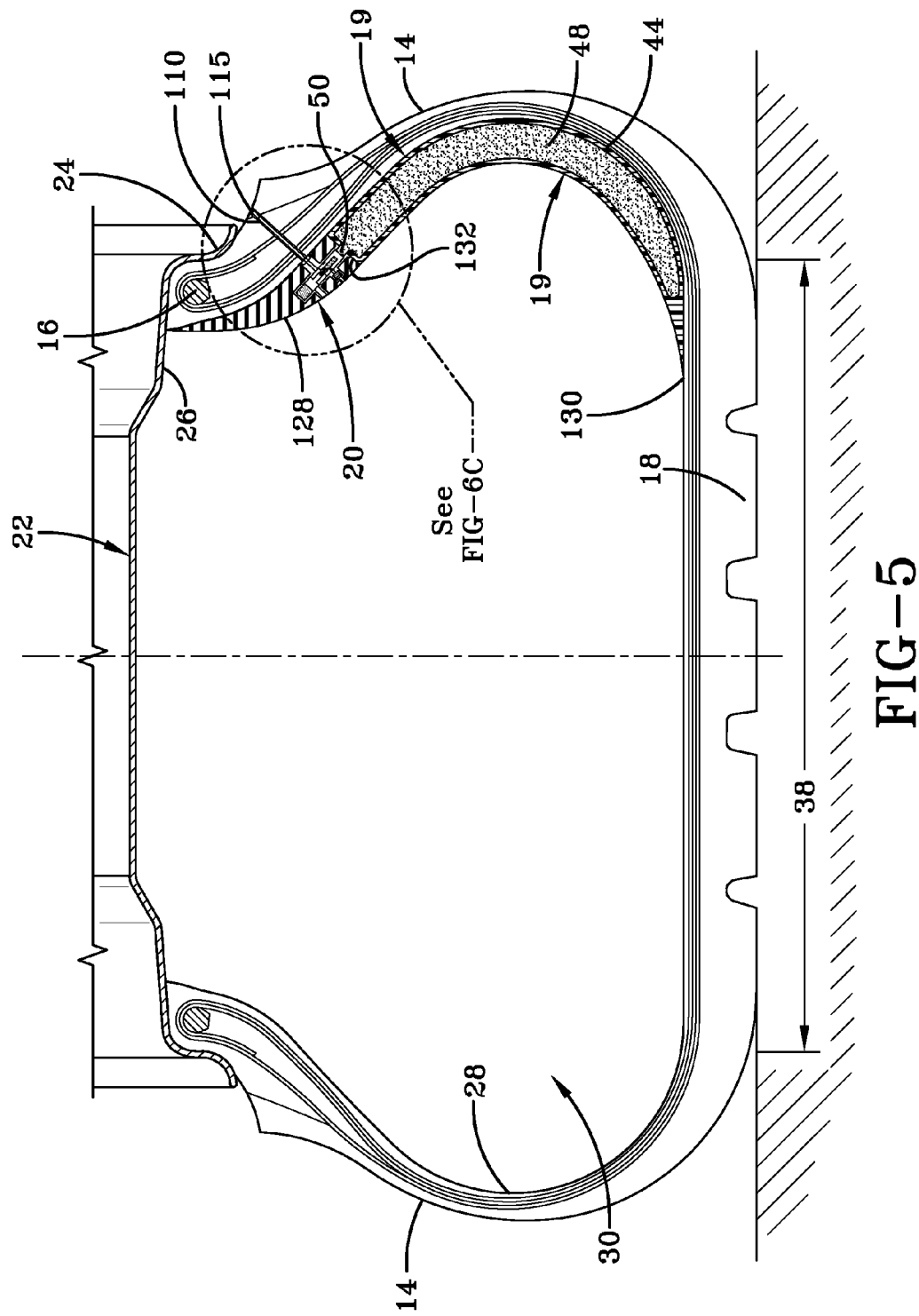
FIG. 5 is a sectioned view taken from 5-5 of FIG. 3B.

The example system 10 mounts to a vehicle and engages a ground surface 34. A contact area between the tire 12 and the ground surface 34 represents the tire footprint 38. The compression actuator assembly 19 mounts to a sidewall region 42 of the tire 12 having a relatively high flex-deformation as the tire rotates in direction 40 against the ground surface 34, as shown in FIGS. 3A and 3B. As the tire rotates, the compression actuator assembly 19 and pump assembly 20 may rotate with the tire. The compression actuator assembly 19 may be subjected to compression forces resulting from the sidewall flexing or bending when the assembly 19 is adjacent the tire footprint 38, as explained below. FIG. 3A and section view FIG. 4 show the compression actuator assembly 19 and pump assembly 20 location in a non-compressed area of the tire 12 while FIG. 3B and section view FIG. 5 show the assemblies 19 and 20 in a compressed area of the tire 12. In the position of FIG. 5, the compression actuator assembly 19 will be subjected to the compression forces 36 generated within the tire footprint 38. The tire 12 rotates in a direction 40 and in the opposite direction during normal operation of a vehicle. As such, the coupled assemblies 19, 20 rotate with the tire 12 in both directions and are subjected to compression forces generated within the sidewall 14 in both forward and reverse tire rotational directions.

In reference to FIGS. 2A, 2B, 4, 5, 6A, 6B, 6C, 6D, and FIG. 7, the example compression actuator assembly 19 includes an elongate hollow containment body 44 formed from a resilient deformable material composition such as thermoplastic resin and/or rubber compound. The body 44 may thus be capable of reciprocatingly and resiliently undergoing a cyclic deformation into a deformed state and recovery into an original non-deformed state when subjected to bending force. The elongate body 44 as shown in FIG. 2A, 4, is sized and shaped to generally follow the inner contour of the tire sidewall 14 from the tread region 18 to the bead area 16. The hollow, elongate form of the containment body 44 may be affixed to the inner liner 28 of the tire 12 at adhesive region 21 or modified in form for incorporation into the tire sidewall, as explained below.

The containment body 44 includes an enclosed central reservoir cavity 46 filled with a volume of non-compressible medium 48. The medium 48 may be in either foam or fluid form. A suitable medium 48 may include, but is not limited to, water with an antifreeze additive. The medium 48 is enclosed by the body 44 within the cavity 46 and generally fills the cavity 46. An outlet conduit 50 is provided to the body 44, the conduit 50 extending generally axially from the body 44 and containing an inner outlet conduit bore 51 through which a displaced quantity of medium 48 may travel in reciprocal directions. The conduit 50 extends to a leading end surface 60.

Figure 6A:
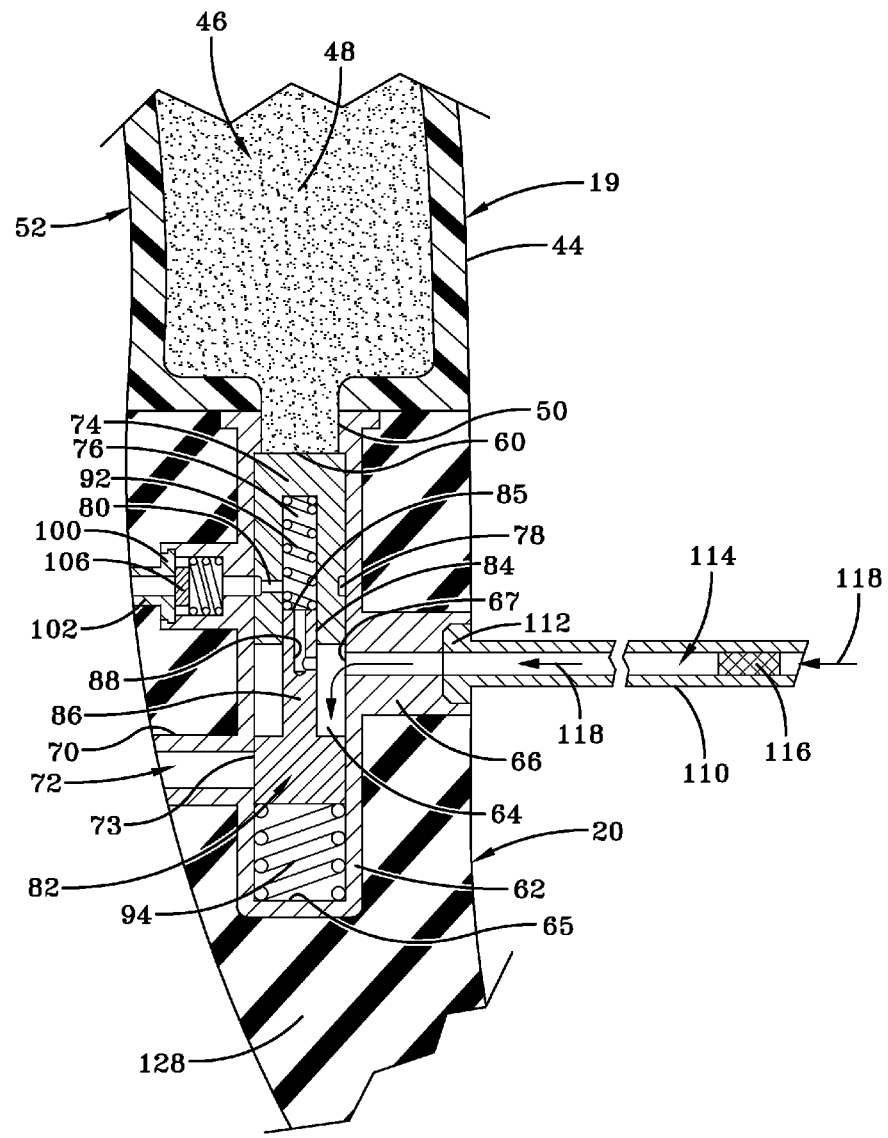
FIG. 6A is an enlarged view of the pump showing piston locations at rest.

Positioned as shown in FIGS. 2A, 2B, 4, 5, the example containment body 44 is subjected to bending forces from the tire sidewall 14 as the region of the sidewall to which the containment body 44 attaches passes proximate to the tire footprint 38 and is compressed by forces 36 on the tread 18 (FIGS. 3B, 5). Bending forces 36 applied to bend the sidewall region 14 serve to cause a commensurate bending deformation 52 of the medium containment body 44 as shown in FIGS. 6A, 6B, 6C and 6D. The deformation 52 introduced into the body 44 by the bending tire sidewall 14 proximate to the tire footprint 38 causes displacement of a quantity 54 of the medium 48 along the outlet conduit 50 in the direction shown at arrow 56 of FIG. 6B. Pressure from the displaced medium quantity 54 acts as a pressure actuator to the pumping assembly 20, as will be explained. When the tire sidewall region 14 to which the body 44 attaches leaves a position proximal to the tire footprint 38, such as the position opposite the tire footprint as depicted in FIG. 6A, the compression force in the sidewall 14 is removed/lessoned, causing a commensurate removal/lessoning of bending force 36 acting on the containment body 44. Removal of bending force 36 in the containment body 44 causes the body to resume its original, non-deformed state, as shown in FIG. 4, and the medium 48 to recede within the conduit 50 in a direction indicated at arrow 58. The cycle of sidewall bending an unbending translates into a cyclic deformation/restoration of the containment body 44 as the tire 12 rotates in either a forward or reverse direction and generates a cyclic compression force from the volume 54 of medium 48 displaced through the conduit 50. The compression force from the displaced volume 54 is in the direction 56 and is proportionate to the pressure generated by the displaced quantity of the non-compressible medium 48.

Referring to FIGS. 6A-D and 7, the example pump assembly 20 is affixed to the tire carcass at a location adjacent the compression actuating assembly 19, preferably in an inward radial direction relative to the assembly. The example pumping assembly 20 includes a hollow compressor body 62 of generally tubular form having an internal axially oriented air chamber 64 which extends to a lower chamber end 65. The air chamber 64 is accessible through an inlet conduit 66 which intersects the air chamber 64 at an inlet opening 67. The body 62 and inlet conduit 66 may be formed of a rigid material such as metal or plastic. The inlet conduit 66 is generally elongate and tubular having an internal axial passageway 68 communicating with the air chamber 64 via the opening 67. On the opposite side of the body 62, an outlet conduit 70 of generally tubular form having an axial passageway 72 may extend therethrough and communicate with the air chamber 64 at an outlet opening 73. The inlet conduit 66 and the outlet conduit 70 are axially offset, with the inlet conduit 66 being closest to the actuating assembly 19 and the outlet conduit 70 being farthest away from the assembly.

A first cylindrical piston member 74 is sized for a sliding position within an upper end of the axial air chamber 64 of the compressor body 62 and includes a blind axial bore 76 extending into an inward piston end surface 75. A recess 78 extends through an outward facing piston side and may function as a collector for air exiting a valve assembly 96. It may connect the valve and the canal inside the piston no matter the angular position of the piston. Extending into a piston side opposite the recess 78 may be a relief valve intake channel 80 that communicates with the blind bore 76.

A second cylindrical piston member 82 is sized for sliding receipt within a lower end of the axial air chamber 64 of the compressor body 62. The second piston 82 includes a cylindrical body 84 and an outward spring-compressing post arm 86 extending from the body 84 to an outward end 85. A blind bore 88 extends into the end surface 85 of the post arm 86. A transversely oriented inlet channel 90 extends through a side of the post arm 86 to communicate with the blind bore 88. A large coil spring 94 may be sized to fit within the lower end 65 of the air chamber 64 within the compressor body 62. A smaller coil spring 92 may further seat against a surface 77 within the blind bore 76 of the first piston 74. A pressure regulating relief valve assembly 96 mounts within an inlet chamber 99 of an inlet tubular sleeve 98 extending from the compressor body 62. The sleeve 98 includes an inlet axial passageway 97 extending from the chamber 99 to the air channel 64 of the compressor body 62.

The example assembly 96 may include a circular body 100 having a tubular entry conduit 102 extending outward. A bore 104 extends through the conduit 102 and body 100. A disk-shaped seal component 106 may be positioned within the chamber 99 inward of the circular body 100 and may be outwardly biased against the circular body 100 by a coil spring 108 seated within the chamber 99.

At the opposite side of the compressor body 62 and affixed to the inlet conduit 66 is an inlet tube 110 having an annular abutment flange 112 at an inward end and an axial passageway 114 extending from an outward tube end 115 through the inlet tube 110 to the inlet opening 67 of the compressor body 62. Seated within the tube passageway 114, proximate the outward tube end 115, may be a porous filter component 116 that functions to filter out particulates from entering the passageway 114. The pumping assembly 20 may be enclosed within an outer sheath 128 that is shaped to complement a radially lower region of the sidewall 14 and extends from the compression actuating body 44 to a location opposite to a tire bead region. The sheath 128 may be formed from a material suitable for attachment to the tire innerliner by a suitable adhesive, such as a rubber matrix.

With respect to FIGS. 4, 5, 6A, and 7, the example compression actuation assembly 19 and the example pump assembly 20 may be connected together as shown for incorporation into the tire carcass. The actuation assembly 19 is incorporated into a region of the sidewall 14 of the tire carcass that experiences a high bending load as the tire 12 rotates. The assembly 19 may either be incorporated within the sidewall 14 or affixed to the sidewall 14 by adhesive as shown. In the externally mounted assembly approach shown, the containment body 44 may be complementarily shaped and curved as the sidewall region to which it attaches and extends generally from a radially outward end 130 proximate the tread region 18 radially inward along the sidewall attachment region to a radially inward end 132 proximate the bead region. The pumping assembly 20 attaches to the inward end 132 of the compression actuation assembly 19 by adhesive or other suitable attachment means.

The pumping assembly 20 may be sheathed within an outer casing 128 composed of a tire compatible material, such as rubber. The coupled compression actuation assembly 19 and pumping assembly 20 may mount by adhesive attachment to the inner liner 28 of the tire carcass with the pump assembly 20 proximate to the carcass bead/lower sidewall region 32. So positioned, the inlet tube 110 to the pump assembly 20 may project in an axial direction through the tire sidewall 14 to an external air-accessible outer tire sidewall side location. Position of the tube 110 may be above the rim flange 24 so that the rim flange 24 will not interfere with air entering the tube 110 of the pumping assembly 20 during tire rotation under load.

The outlet conduit 50 of the compression assembly 19 may couple into the upper end of the compressor body 62 as the outlet conduit 50 of actuator body 44 is received in sealing engagement with the upper end of the compressor body. The compressor body 44 abuts against the sheath 128 containing the pumping assembly 20. Once the assemblies 19, 20 are attached together, they may be attached to a region of the tire sidewall 14 as shown in FIGS. 2A and 4, as explained above. The first and second pistons 74, 82 are mechanically coupled as the post arm 86 from the second piston 82 projects into the bore 76 and against the spring 92 seated within bore. Axial movement of the pistons 74, 82 are thus synchronous within the air chamber 44 in both radial directions.

FIGS. 6A-6D depict the sequential operation of the example pump assembly 20 and example compression actuator assembly 19. FIG. 6A shows the pump assembly 20 with the pistons 74, 82 at rest positions. The position shown correlates with a position of the assemblies 19, 20 mounted to a rolling tire as shown in FIG. 3A at a rotational position opposite to the tire footprint 38. The sidewall area supporting assemblies 19, 20 when opposite the tire footprint 38 (FIG. 6A) is not flexed or bent from contact with the ground surface. Accordingly, the compression actuator body 44 has a bending deformation 52 that generally correlates with the curvature of the unbent sidewall 14. The medium 48 enclosed within the body 44 is generally at rest and contacts the leading surface 60 within conduit 50 against the end of piston 74. The outer piston 74 is retracted toward the outer end of the air chamber 64 under spring bias from the coil spring 92.

In the "at rest" position of FIG. 6A, the piston 74 is axially above the intake opening 67 of the inlet conduit 66. As a result, air from outside of the tire 12 is admitted through the filter 116 and into the bore 114 of the inlet conduit 110 from which it travels through the opening 67 of the inlet conduit 66 and into the air chamber 64. Arrows 118 show the path of inlet air travel. The piston 82 is in an axially raised position within the air chamber 64 and blocks off the outlet opening 73 of the outlet conduit 70. Springs 92, 94 are in respective uncompressed conditions. The relief valve assembly 96 is generally in a closed position so long as the air pressure within the tire cavity 30 remains below a preset recommended inflation pressure. In the closed position, the spring 108 biases the stop disk head 106 against the opening 102 through conduit body 100. Should the pressure within the tire cavity 30 exceed a pressure threshold, the air pressure from the cavity will force the stop 106 away from the conduit opening 102 and allow air to escape from the tire cavity.

Figure 6B:
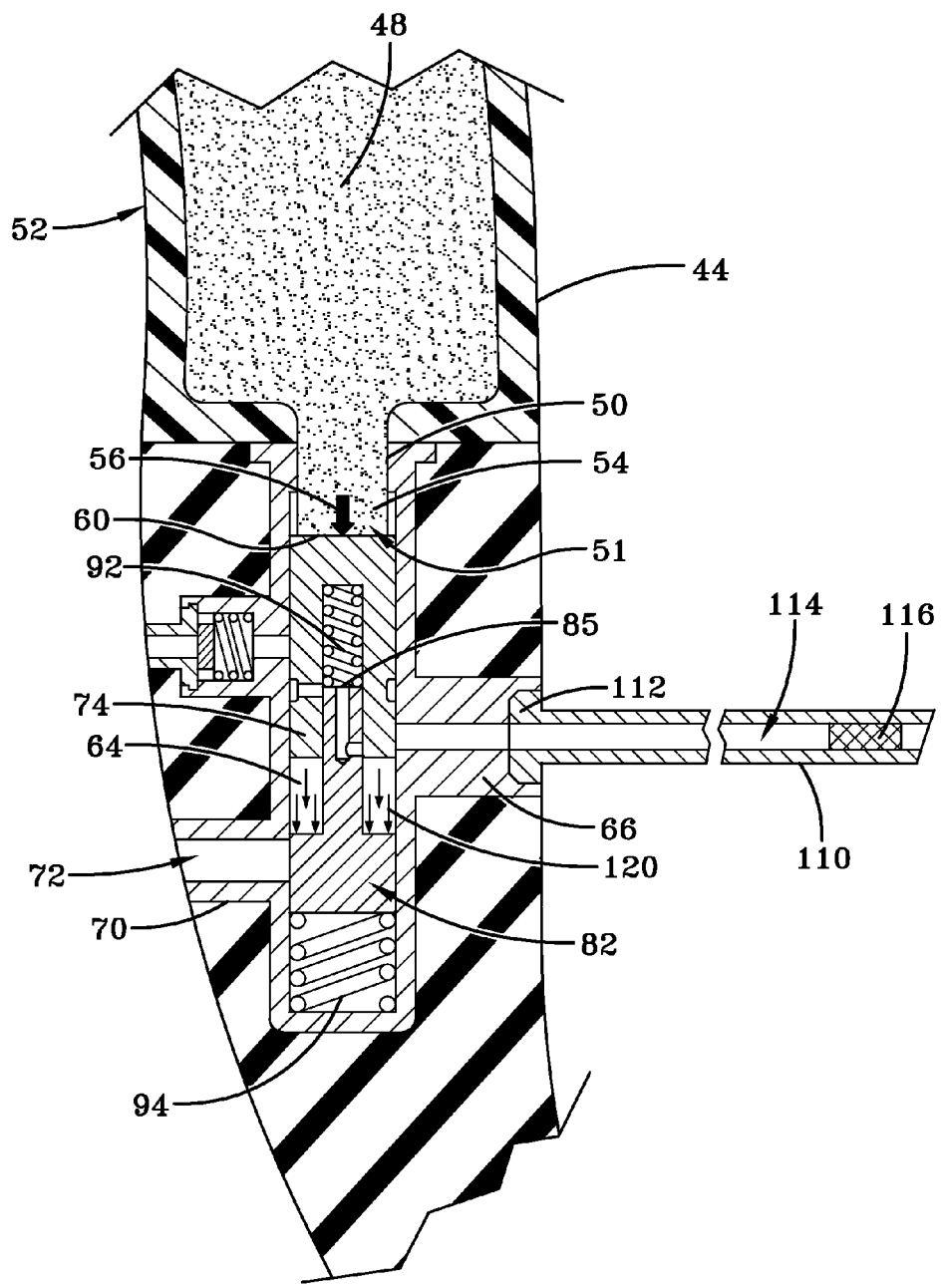
FIG. 6B is an enlarged view of the pump showing a viscoelastic material moving the upper piston downward and compressing air between the pistons.

As the region of the sidewall 14 carrying the assemblies 19, 20 rotates into a position adjacent the tire footprint 38, the sidewall 14 flexes and bends, causing a commensurate flexing of the compression actuator body 44 as shown at numeral 52 of FIG. 6B. FIG. 6B shows that the viscoelastic material 48, having non-compressible material properties, in response to the bending of body 44 is forced lower within the outlet conduit 50 and exerts a downward pressure on the first piston 74 as indicated by arrow 56. The leading end surface 60 of the medium 48 bears against the outward surface of the piston 74 and overcomes the resistance of coil spring 92 and compresses the spring 92 to allow the first piston 74 to move lower into the air chamber 64. In so doing, the first piston 74 moves into a position blocking air intake into the air chamber 64 through the intake tube 110 and compresses the volume of air within the air chamber. Increased pressure of air within the air chamber 64 forces the second piston 82 lower within the air chamber and compresses the coil spring 94.

Figure 6C:
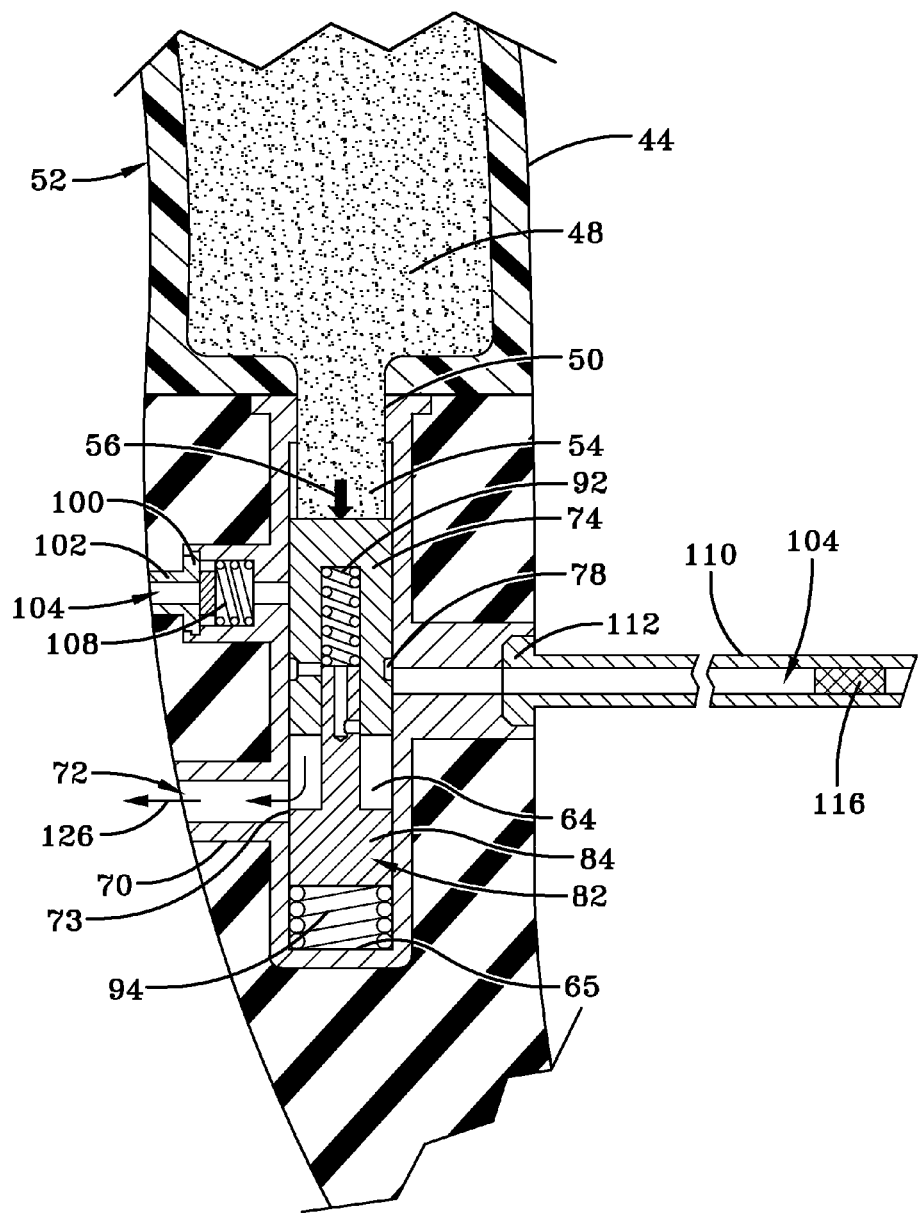
FIG. 6C is an enlarged view of the pump showing the upper and lower pistons moving and releasing compressed air into the tire cavity.

When the second piston 82 has moved a sufficient axial distance within the air chamber 64, the outlet opening 73 into the outlet conduit channel 72 ceases to be obstructed by the second piston 82 as shown in FIG. 6C and FIG. 5. Pressurized air from the air chamber 64 is thus forced through the channel 72 and into the tire cavity 30 in the direction indicated by arrow 126. When the pumping of air is complete and pressure within air chamber 64 against the second piston 82 is discontinued, the second piston is forced axially upward and back into the at-rest position shown both in FIG. 6D and FIG. 6A.

Figure 6D:
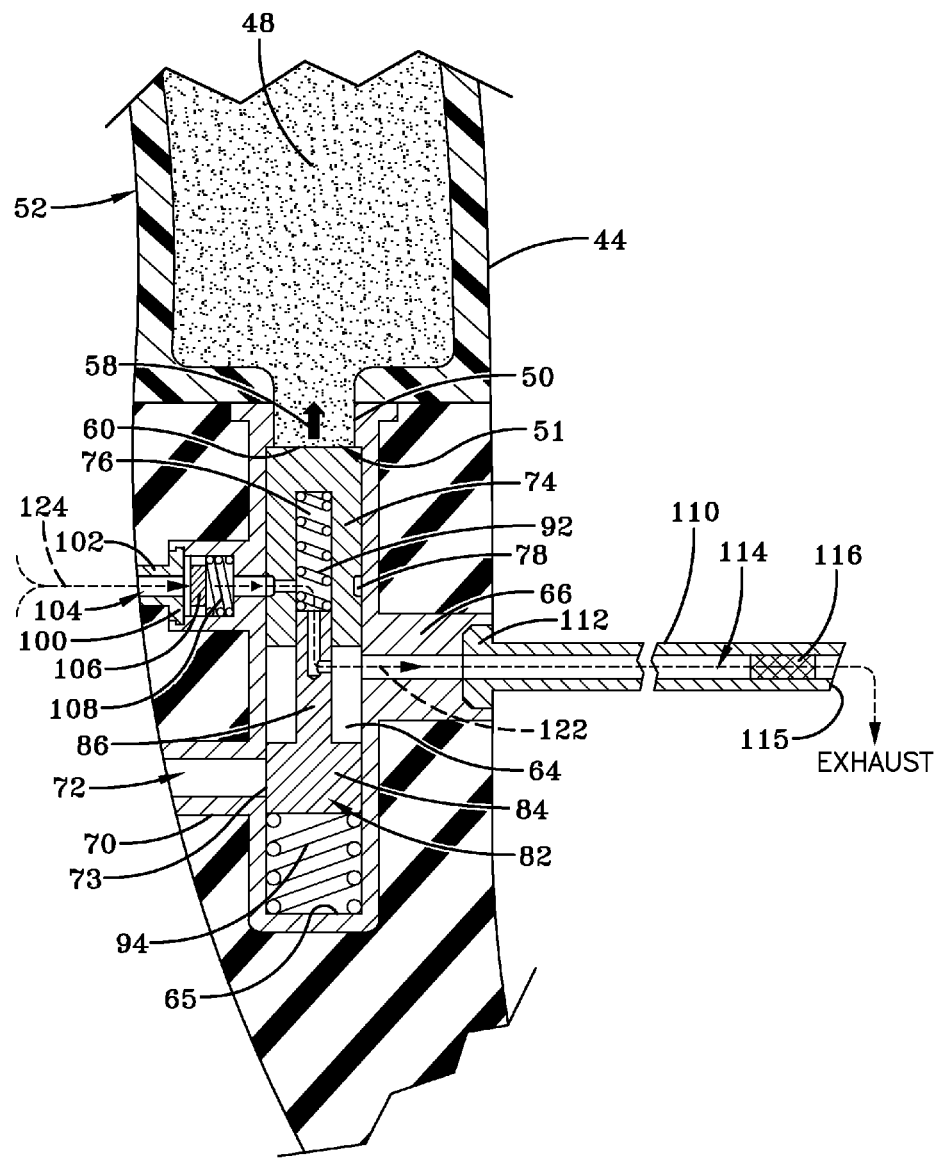
FIG. 6D is an enlarged view of the pump showing the pistons at rest and the relief valve releasing over-pressure in the tire cavity to the atmosphere.

As seen from FIG. 6D, once removal of the quantity of pressurized air within the air chamber 44 into the tire cavity 30 is complete, with further rotation of the tire 12, the assemblies 19, 20 at the attachment region of sidewall 14 leave the high stress position opposite the tire footprint 38 and the tire sidewall region resumes an unstressed curvature as shown in FIGS. 2A and 3A. The return of the sidewall 14 to an original curvature configuration away from the tire footprint 38 is accompanied by, and synchronous with, a return of the actuator body 44 to an unbent/unstressed configuration. As the actuator body 44 resumes its original curvature, and commensurate with the end of the pumping cycle of air from air chamber 64, the second piston 82 moves axially upward under the influence of the coil spring 94, which moves the second piston 74 in a radial upward direction. The viscoelastic medium 48 recedes into the original containment form of the actuator body 44 and the pumping of air into the tire cavity 30 is discontinued until the assemblies 19, 20 rotate with the tire 12 back into alignment adjacent the tire footprint 38. With each revolution, the pumping of air from the air chamber 64 into the tire cavity 30 occurs in cyclic fashion. It will be appreciated that the operation of the air pumping action is independent of the direction of tire revolution and will occur in either a forward or reverse rotation.

FIG. 6D also depicts view of the pump assembly 20 wherein first and second pistons 74, 82 are in the at-rest position while the relief valve assembly 96 functions to vent over-pressure air in the tire cavity 30 to the atmosphere. The relief valve assembly 96 is generally in the closed position, shown in FIGS. 6A through 6C, and only opens when air pressure within the tire cavity 30 exceeds a recommended upper threshold. In such an event, the stop body 106 is forced laterally out of sealing engagement against with conduit flange 100 and overcoming biased resistance from the coil spring 108. The passageway 104 is thus opened to allow over-pressure air from the tire cavity 30 through the conduit 102 and the relief channel 80 within first piston 74, as indicated by directional arrow 124. The pressurized air follows a path through the blind bore 76 of the first piston 74, through the blind bore 88 within the coupling post 86 of second piston 82, and into the bore 114 of tube 110, as indicated by directional arrow 122. The expelled overpressure air exhausts to the atmosphere through the filter 116 and out of the tube end 115. The exhaust of air through the filter 116 operates to clean particulates from the filter, as well as correcting the over-pressure within the tire cavity 30. Once the pressure in the tire cavity 30 is reduced below the threshold recommended pressure, the coil spring 108 will uncoil and pressure the stop body 106 against the conduit flange 100 and thus close off the tire cavity until overpressure exhausting of air from the tire cavity is necessary.

Figure 10A:
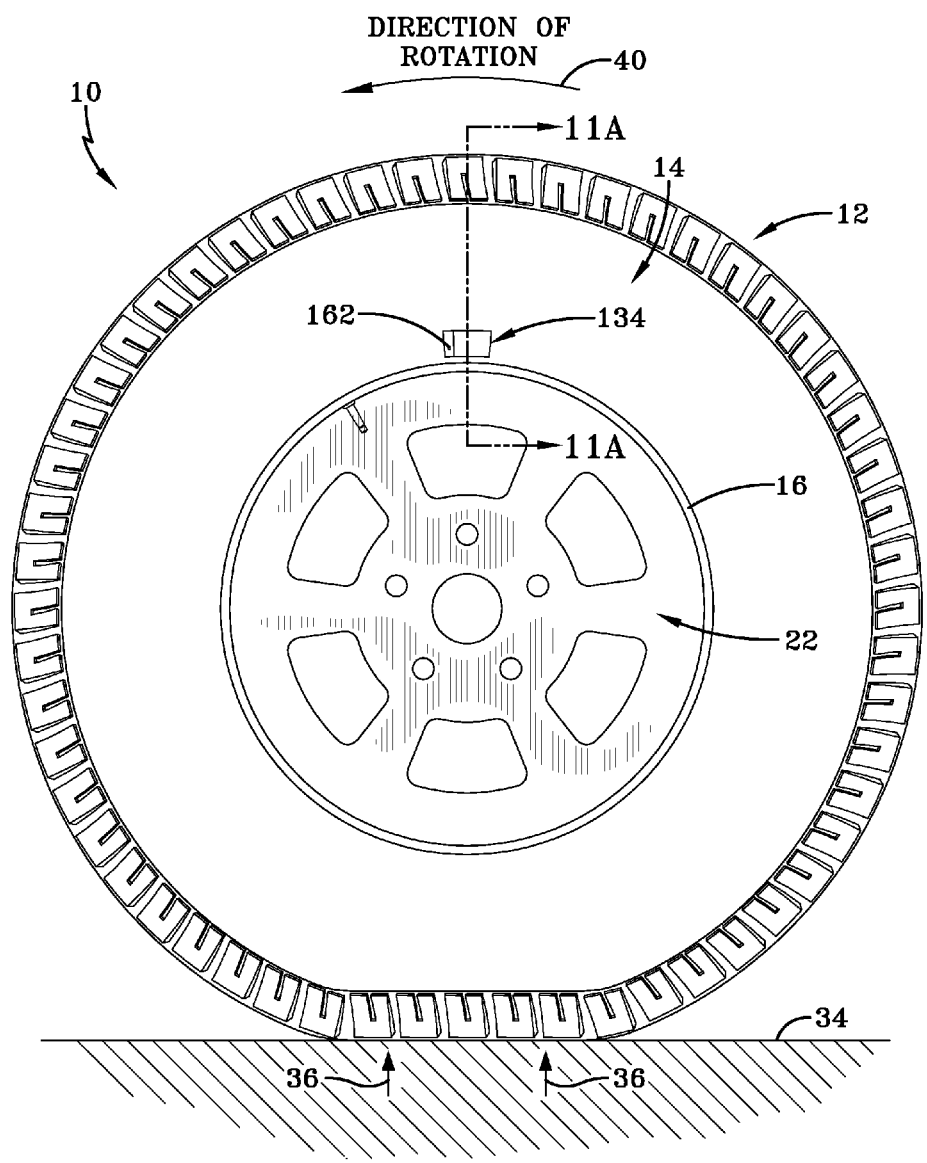
FIG. 10A is a side view showing a pump location in a non-compressed area of a tire.
Figure 10B:
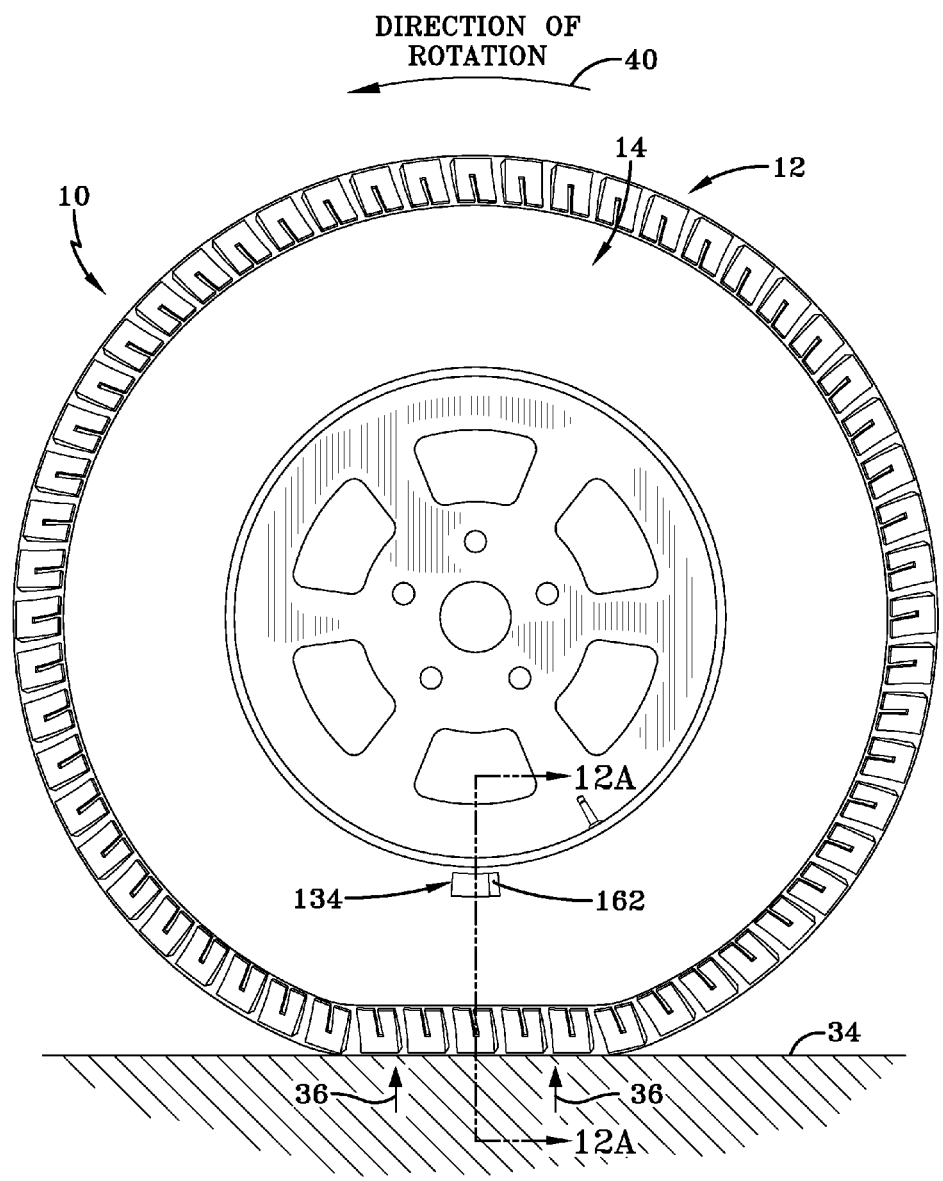
FIG. 10B is a side view showing a pump location in a compressed area of the tire.

Referring to FIGS. 9A, 9B, 10A, 10B, 11A, 11B, 12A, 12B, 13A through 13D, 14A through 14C, inclusive, an alternative example embodiment of a pump and compression actuator assembly 134 is shown including a compression actuator assembly 136 coupled to a pump assembly 138 to form an L-shaped insert body 140. The body 140 mounts to a lower sidewall region of a tire 12 proximate to a bead region 16, as shown in FIGS. 10A, 10B. The compression actuator assembly 136 has a deformable hollow body 142 forming a containment chamber 144 communicating with an outlet portal 146. The containment body 142 is configured at ninety degrees into an L-shape having an upright body portion 148 extending from a horizontal body portion 150. A viscoelastic medium of non-compressible material 152 fills the containment chamber 144, as previously described in reference to the first example embodiment.

The pump assembly 138 likewise forms an L-shaped encapsulation sheath body 154 affixed to the L-shaped compression actuator body 142. The sheath body 154 includes an upright body portion 158 extending from a horizontal body portion 156. An outlet orifice 160 is positioned within the horizontal body portion 156 and an inlet orifice 162 in a side facing region of the horizontal body portion 156. An outlet conduit 168 is attached to the outlet orifice 160 and includes an axial passage 170 extending to a remote end.

Figure 11A:
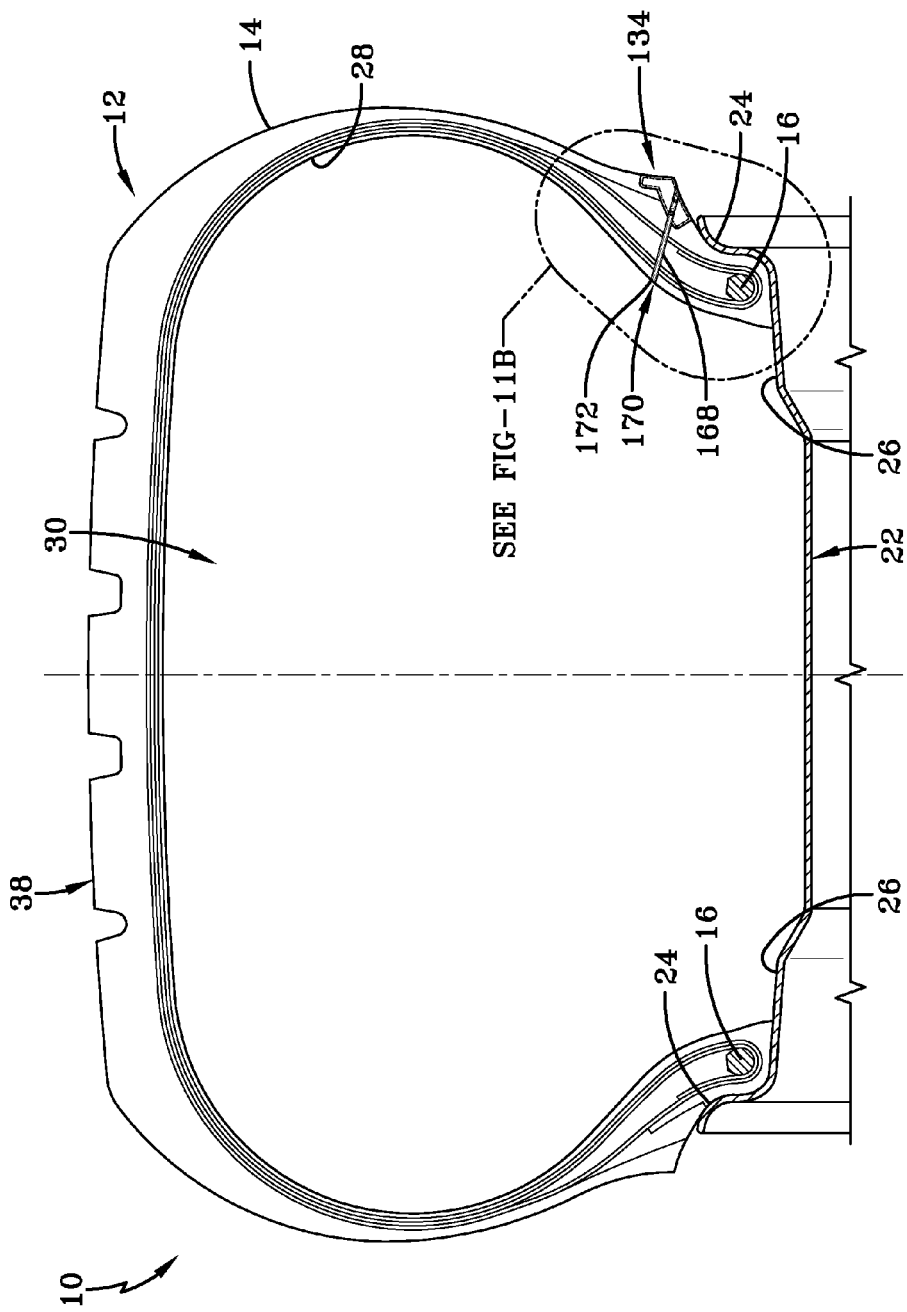
FIG. 11A is a sectioned view taken from 11A-11A of FIG. 10A.
Figure 11B:
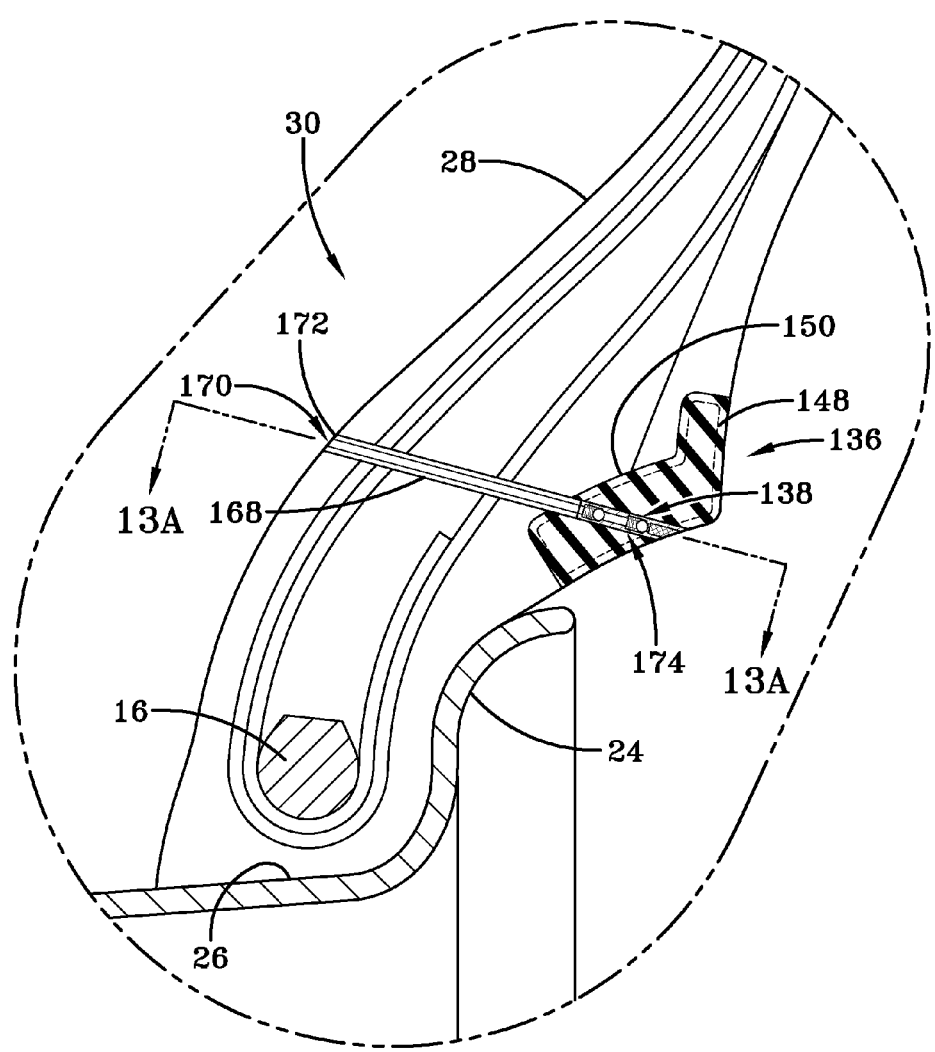
FIG. 11B is an enlarged view of the pump taken from FIG. 11A.

FIGS. 10A and 10B show the mounting of the L-shaped pump assembly 134 to a tire 12 at a lower sidewall region proximate to a tire bead location. As with the first example previously described, the pump assembly 134 rotates with the tire 12 from a location outside of proximity to the tire footprint 38 (FIG. 10A) into a position adjacent the tire footprint (FIG. 10B) with each tire revolution. As with the first example, the insert body 140 is bent by stress induced from a bending of the tire sidewall 14 as the rotational position of assembly aligns adjacent the tire footprint 38 (FIG. 10B). FIGS. 11A and 11B show the relative position of the pump assembly 134 within the lower region of sidewall 14 where the insert body 140 is subjected to high bending forces as the tire 12 rotates. The outlet end 172 of the outlet conduit 168 extends through the tire wall to the tire cavity 30 of the tire 12. Compressed air from the compressor body 174 travels along passage 170 and into the tire cavity 30 to keep the inflation pressure of the tire 12 at a desired level.

Figure 12A:
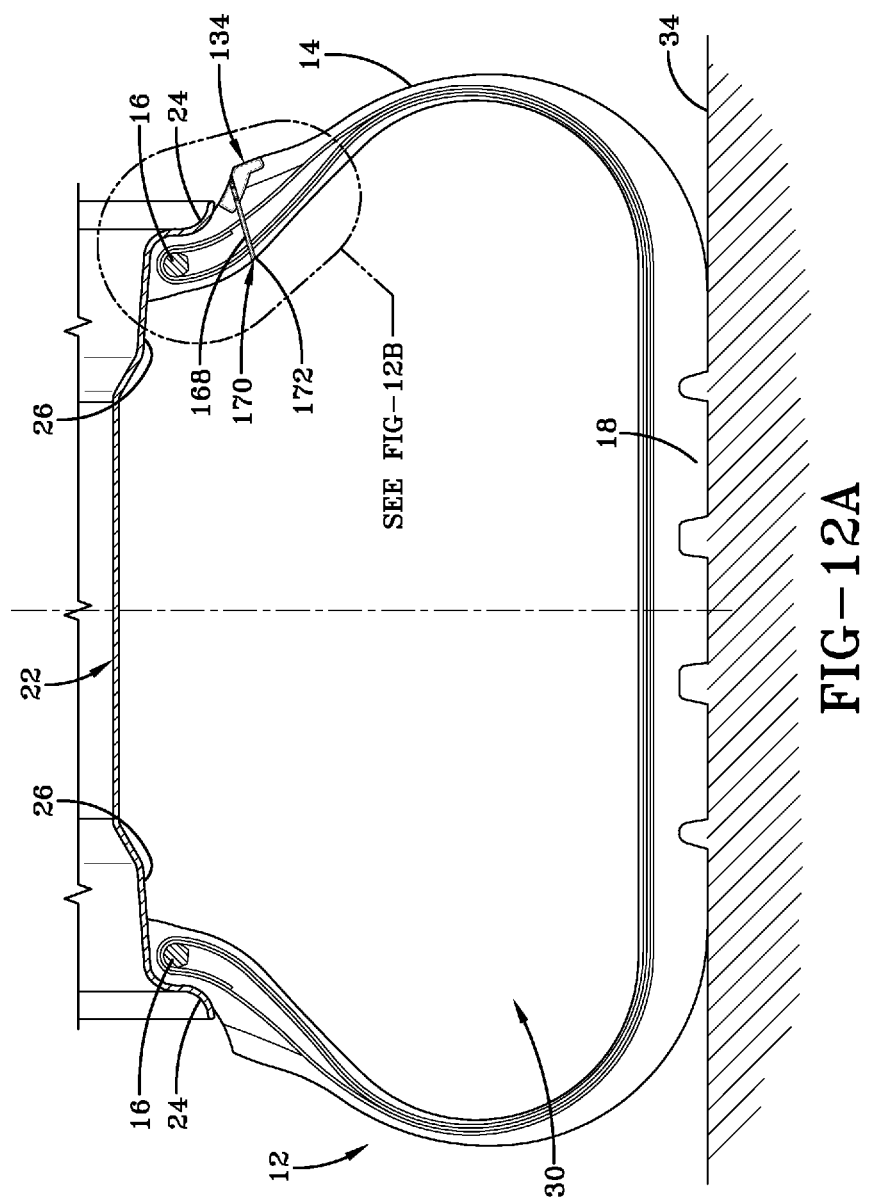
FIG. 12A is a sectioned view taken from 12A-12A of FIG. 10B.
Figure 12B:
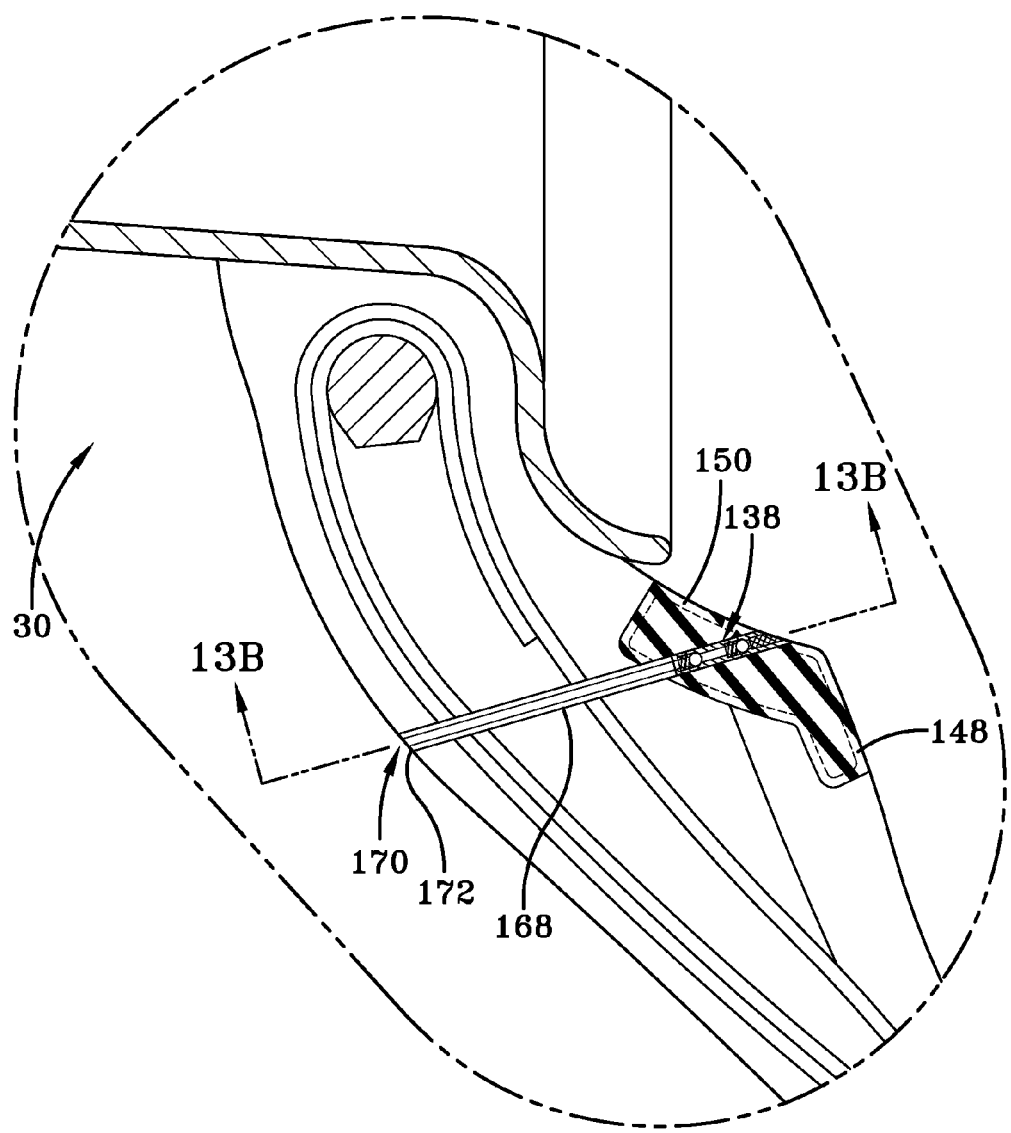
FIG. 12B is an enlarged view of the pump taken from FIG. 12A.

FIG. 11A is a sectioned view taken from a pump location in a non-compressed area of the tire 12, as shown in FIG. 10A. FIG. 11B is an enlarged view of the pump assembly 134 of FIG. 11A. FIG. 12A is a sectioned view taken from a pump location in a compressed area of the tire 12, as shown in FIG. 10B. FIG. 12B is an enlarged view of the pump assembly 134, as depicted in FIG. 12A.

With reference to FIGS. 13A through 13D and 14A through 14C, the compression body 174 has an internal elongate compression chamber 176 and a pair of one-way ball valves 178, 180 positioned at opposite ends of the chamber 176. Each of the valves 178, 180 may be of a type commercially available and each includes a stop ball component 182 biased by a coil spring against a seat 186. In addition, a relief pressure by-pass passage 188 is provided within the compression body 174 in parallel to the compression chamber 176. Seated within the passage 188 is a one-way ball valve 190 of similar configuration as the ball valves 178, 180. The passageway 188 and the chamber 176 extend in parallel between the outlet conduit 168 at one end of the body 174 and the inlet opening 162 at another opposite end.

Figures 13C, 13D:
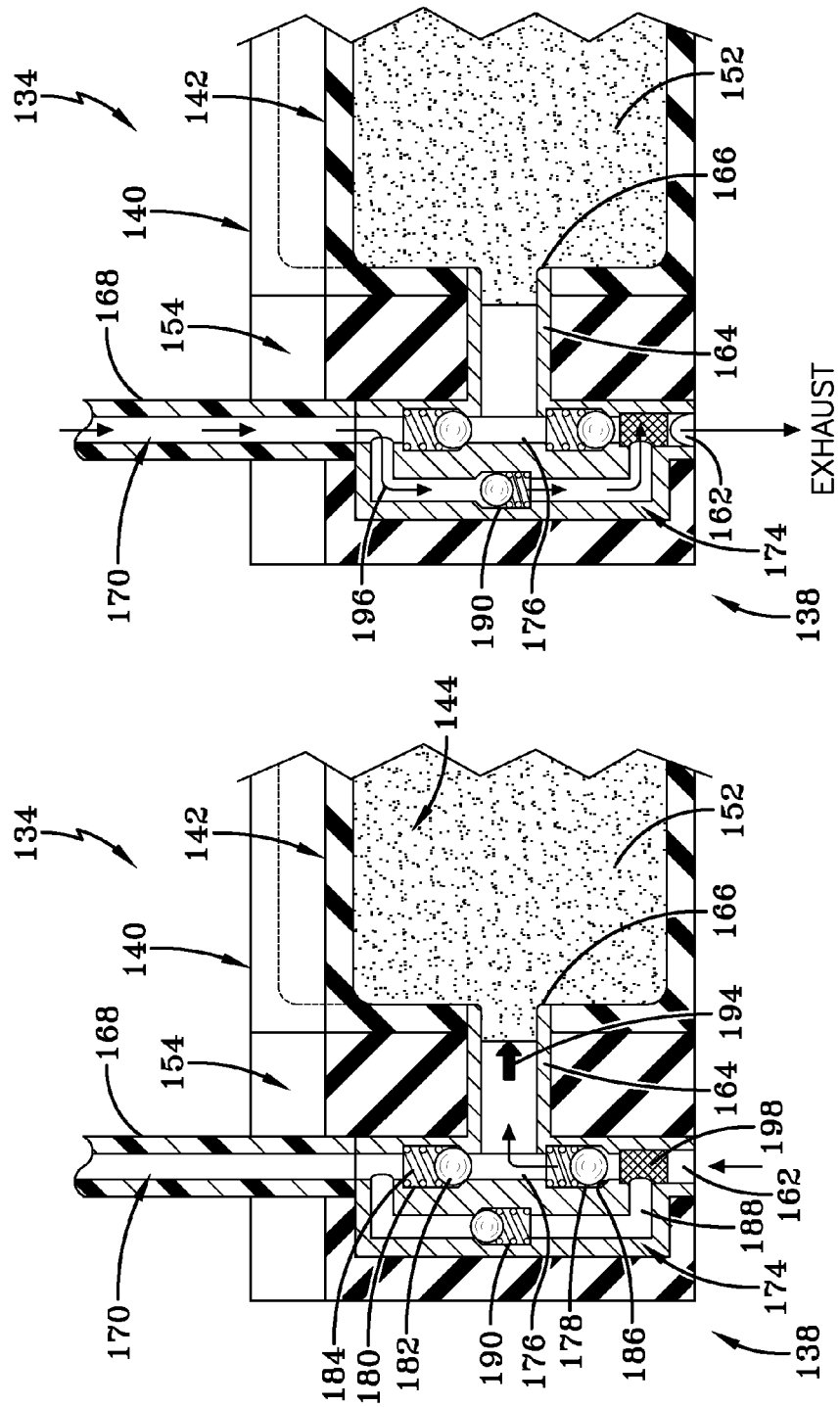
FIG. 13C is a sectioned view showing a viscoelastic material returning to the upper housing and pulling outside air through the first one-way valve thereby filling the inner chamber.
FIG. 13D is a sectioned view showing the relief valve releasing tire cavity over-pressure to the atmosphere.
Figure 14A:
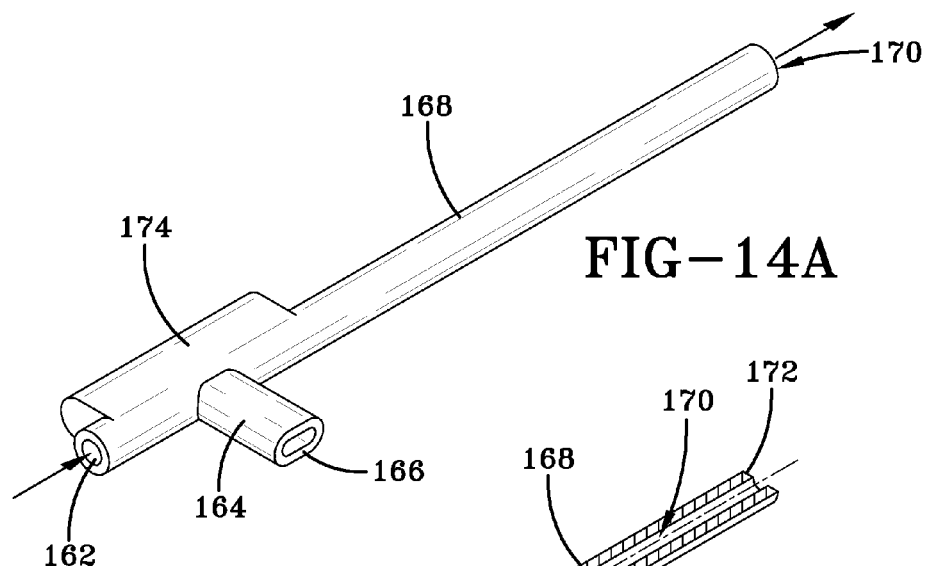
FIG. 14A is a perspective view of a pump body insert.
Figure 14B:
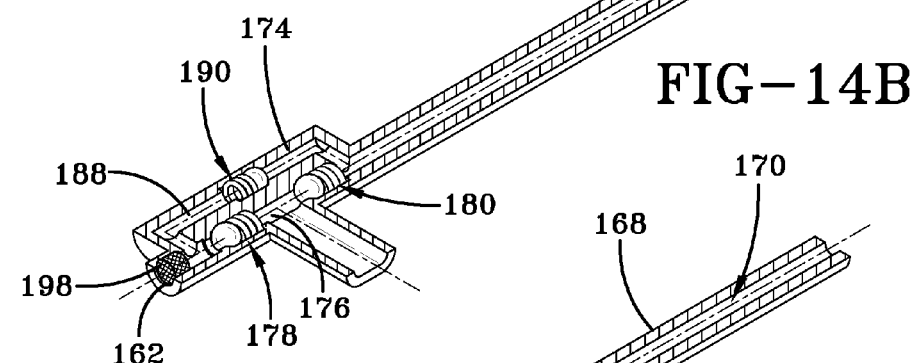
FIG. 14B is a perspective cross section view of the pump body insert.
Figure 14C:
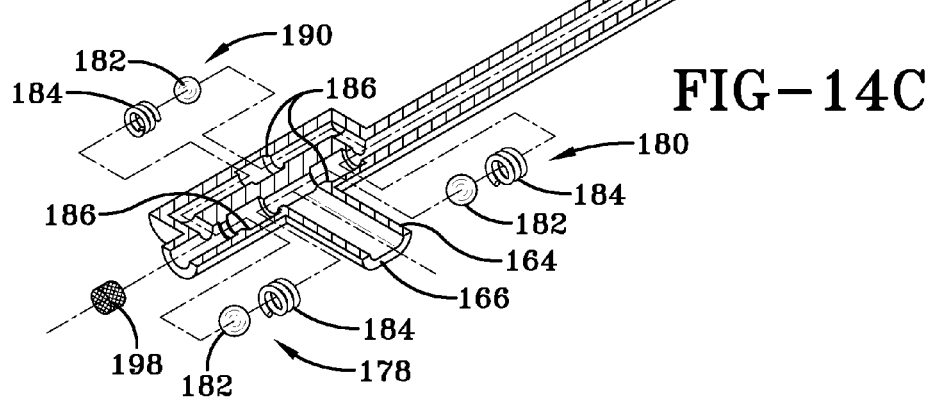
FIG. 14C is a perspective exploded cross section view of the pump body insert.
Figure 16:
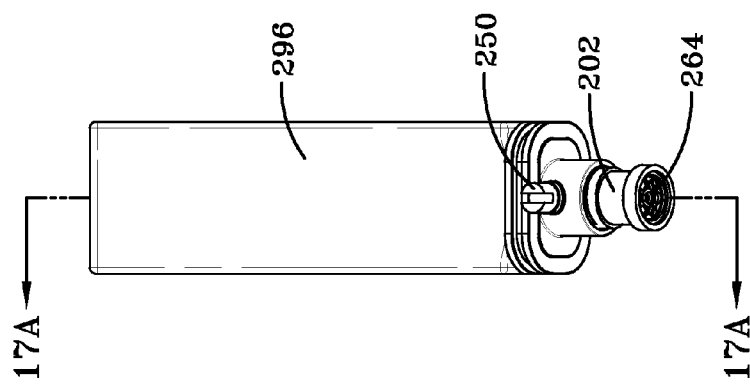
FIG. 16 is a bottom perspective view of the piston pump assembly.

Operation of the first alternative form of the example pumping assembly 138 may include the L-shaped body 136 embedded or affixed to the tire 12 in the position shown generally by FIGS. 10A and 10B. So positioned, as the tire sidewall 14 to which the assembly 138 undergoes bending, the compression actuator body 142 will likewise undergo bending. FIGS. 13A and 13D show the pump assembly 138 in an "at-rest" status; that is, with the assembly 138 not under bending stress as the tire position of FIG. 10A represents. The ball valves 178, 180 are in a seated and closed position. The valves 178, 180 are selected to open at a desired threshold pressure as will be explained.

In the at-rest position, air within the compression chamber 176 is unpressurized. The relief valve 190 is likewise seated and closed and will remain so unless the air pressure within the tire cavity 30 is greater than a desired pressure threshold. In an over-pressure situation, the valve 190 will open and allow air to escape the tire cavity 30 through passage 188 and exhausted from the inlet opening 162 to the atmosphere. The compression medium 152 is confined to the compression body chamber 176 and the inlet conduit 164 is clear.

FIG. 13B and FIG. 12B show the example pump assembly 134 when the tire 12 has rotated the assembly into a position adjacent the tire footprint (FIG. 10B). The compression body 174 is then subjected to a bending force and is deformed. The bending of the body 174 forces the viscoelastic material 152 from the chamber 144 into and along the conduit 164 (direction 192) which, in turn, acts to compress air within the compression chamber 176. Pressure from the compressed air opens the valve 180 by unseating the ball valve 182 and air is channeled into the outlet conduit 168 to the tire cavity 30.

FIG. 13C represents the example pump assembly 134 after further rotation of the tire 12 occurs, positioning the pump assembly away from the tire footprint 38 such as the position shown in FIG. 10A. The removal of bending force to the body 174 allows the resilient body to return to its original configuration and chamber 176 to a form allowing the medium 152 to recede back from the conduit 164. The transfer of pressurized air from the chamber 176 draws air into the chamber from the atmosphere through the unseating of one-way valve 178 from its seat 186. Air drawn into the chamber 176 forces the medium 152 back into the chamber 144 as shown at arrow 194. The valve 180 has reseated itself and blocks off air from exiting the chamber 176. A filter member 198 within the inlet end of the chamber 176 may keep particulates from entering the chamber.

FIG. 14D shows the example pump assembly 134 back to its original at-rest position. In the event that an over-pressure situation arises within the tire cavity 30, the tire air pressure will cause the one-way valve 190 to open and air to flow in the direction 196 back through the passage 188 for exhaust through the filter 198 and into the atmosphere. The back flow of air through the filter 198 helps to keep the filter clean. As with the first example, the pump assembly 134 operates in either direction of tire rotation and pumps air into the tire 12 during each cycle of tire revolution.

With reference to FIGS. 15, 16, 17A, 17B, 18A, and 18B, an example tank-based hydraulic pump assembly 200 is shown in a commercially viable configuration. The example assembly 200 is functionally analogous to the embodiment of FIGS. 4 and 7, as previously discussed. The example assembly 200 includes an air compressor body 202 having an elongate axial bore or chamber 204. The chamber 204 is subdivided into a rearwardly located membrane chamber 206 at a rearward end 208 of the body 202. The rearward end 208 of the body 202 may have external screw threads 210 for assembly purposes. Adjacent to the rearward membrane chamber 206 is a medial air compression chamber 212. Positioned at the air compression chamber 212 is a tubular inlet air channel 214 extending through a sidewall of the body 202 into communication with the air compression chamber 212. An external inlet sleeve 216 extends from the body 202 opposite the channel 214 and encloses a through-bore 218. Assembly screw threads 220 may be positioned within the bore 218.

Separating the chambers 206 and 212 along the bore 204 is an annular membrane abutment shoulder 222. Adjacent to the chamber 212 at an opposite end along the bore 204 is a concave end wall 224. Inwardly tapering sidewalls 223 define the chamber 212 and extend from the annular abutment shoulder 222 to the end wall 224. A circumferential array of through-apertures 227 are positioned within the concave end wall 224. A circular outlet stop assembly 226 seats within the body 202 on the opposite side of the concave end wall 224. A pair of annular detent channels 230, 232 are formed within an outlet bore 228 at an end 231 of the compressor body 202. The outlet stop assembly 226 seats within a forwardmost channel 230 in position adjacent the end wall 224.

A head cap member 234 having an axial internal chamber 236 attaches to the rearward end 208 of the body 202. The cap member 234 includes an outer flange 238 and an annular detent channel 239 adjacent a cap flange 238. The head cap member 234 has a cylindrical body portion 240 with internal screw threads 242. Extending through a sidewall of the cap member 234 is a fill conduit 244 having a throughbore 246 and internal screw threads 248. A screw member 250 includes threads 252 that thread into the fill conduit 244.

An inlet conduit 254 has a cylindrical body 256 and an end 258 that threads into the inlet sleeve 216. An enlarged head 260 is integrally joined to the body 256 and a throughbore 262 extends axially through the inlet conduit 254, end to end. The outlet stop member 226 includes a circular snap-ring body 264 dimensioned for close receipt within the outlet bore 228 and formed of a suitably rigid material, such as plastic. The snap-ring body 264 is frictionally inserted and seats within the annular detent channel 230. The snap-ring body 264 has a circular array of spaced apart apertures 266 extending therethrough and a slideably mounted central plug member 268 disposed within a center aperture of the snap-ring body 264. The plug member 268 has a body 272 including an enlarged circular sealing disk at a forward end positioned opposite to the apertures 227 within the concave end wall 224 of the air compression chamber 212. The body 272 resides within the center aperture of the snap-ring body 264. An annular flared spring flange portion 274 is formed at the rear of the body 272. The plug member 268 is formed from a sufficiently resilient elastomeric material, such as plastic, so as to be compressible in an axial direction within the center aperture of snap-ring body 264. Accordingly, the plug member 268, in the uncompressed state, positions the sealing disk 270 in a sealing engagement against the apertures 227. Under air pressure, the sealing disk 270 moves rearward into an "open" position wherein the apertures 227 are unobstructed. Movement of the plug member 268 between the uncompressed "closed" position and the compressed "open" position is controlled by air pressure within the compression chamber 212, as will be explained.

A circular retaining spring clip 276 is positioned within the detent channel 232 and is operative to hold the outlet stop member 226 within its respective channel 230. An elastomeric membrane component 278 has a generally circular disk-shape. The membrane component 278 has an annular ring body 280 which circumscribes a central circular flexible membrane panel 282. The ring body 280 of the membrane component 278 is of sufficiently rigid material composition such as rubber to hold its form while the membrane panel 282 is sufficiently thin and resiliently flexible to move between a bulging configuration and a non-bulging configuration. Thus, the membrane panel 282 is operatively capable of bulging outward under rearward air pressure and sufficiently resilient to revert back to an original orientation when such pressure is removed.

The membrane component 278 is seated within the membrane chamber 206 of the compressor body 202 against an internal annular body shoulder 283. An annular retention collar 284 is positioned within the membrane chamber 206 behind the membrane component 278. The cap member 234 is assembled by screw thread engagement to the rear of the compressor body 202, as shown. In the assembled condition, the axial compression chamber 206, a central bore chamber 286 of the membrane component 278, and the axial chamber 236 of the cap member 234 are in co-axial alignment.

Figure 7:
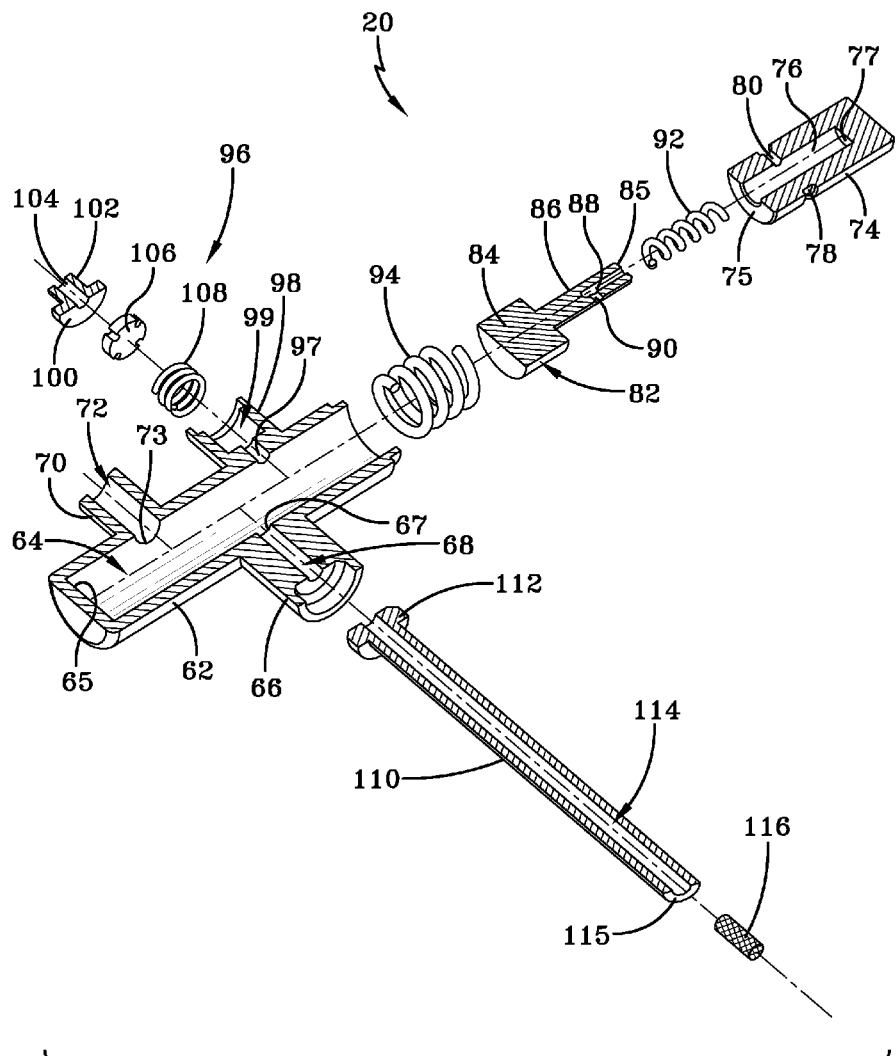
FIG. 7 is an exploded cross section of the pump body.
Figure 8:
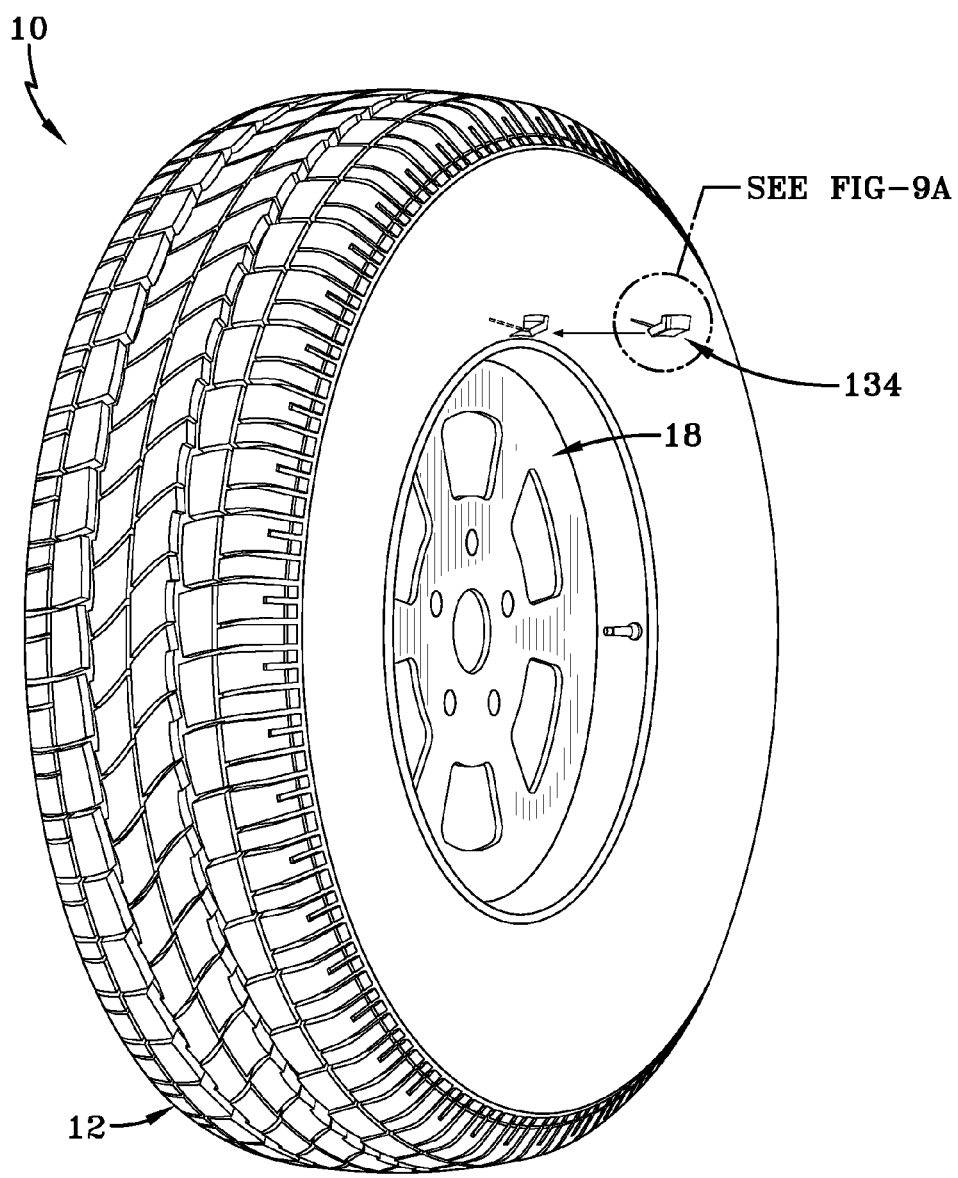
FIG. 8 is a perspective view of a tire showing a second pump location.
Figure 9A:
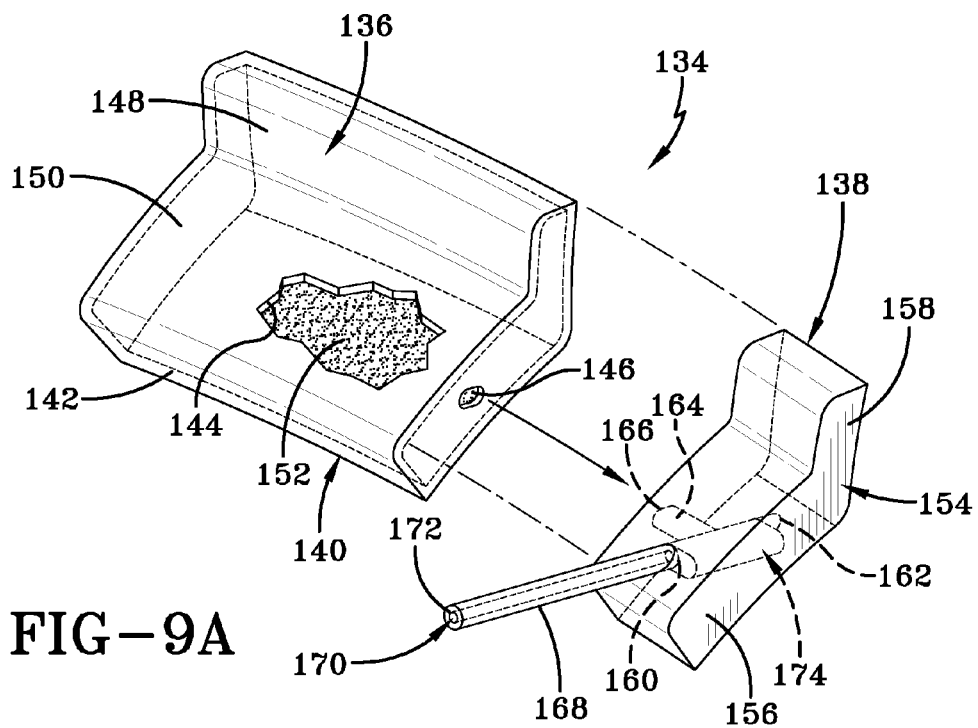
FIG. 9A is a perspective view of the exploded 2-part pump of FIG. 8.
Figure 9B:
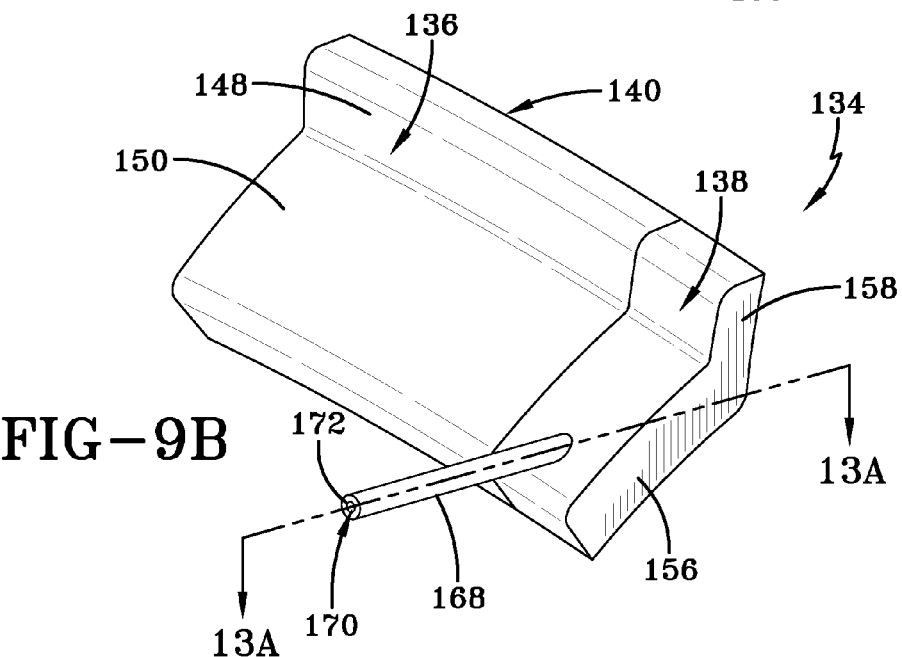
FIG. 9B is a perspective view of an assembled pump.
Figure 17A:
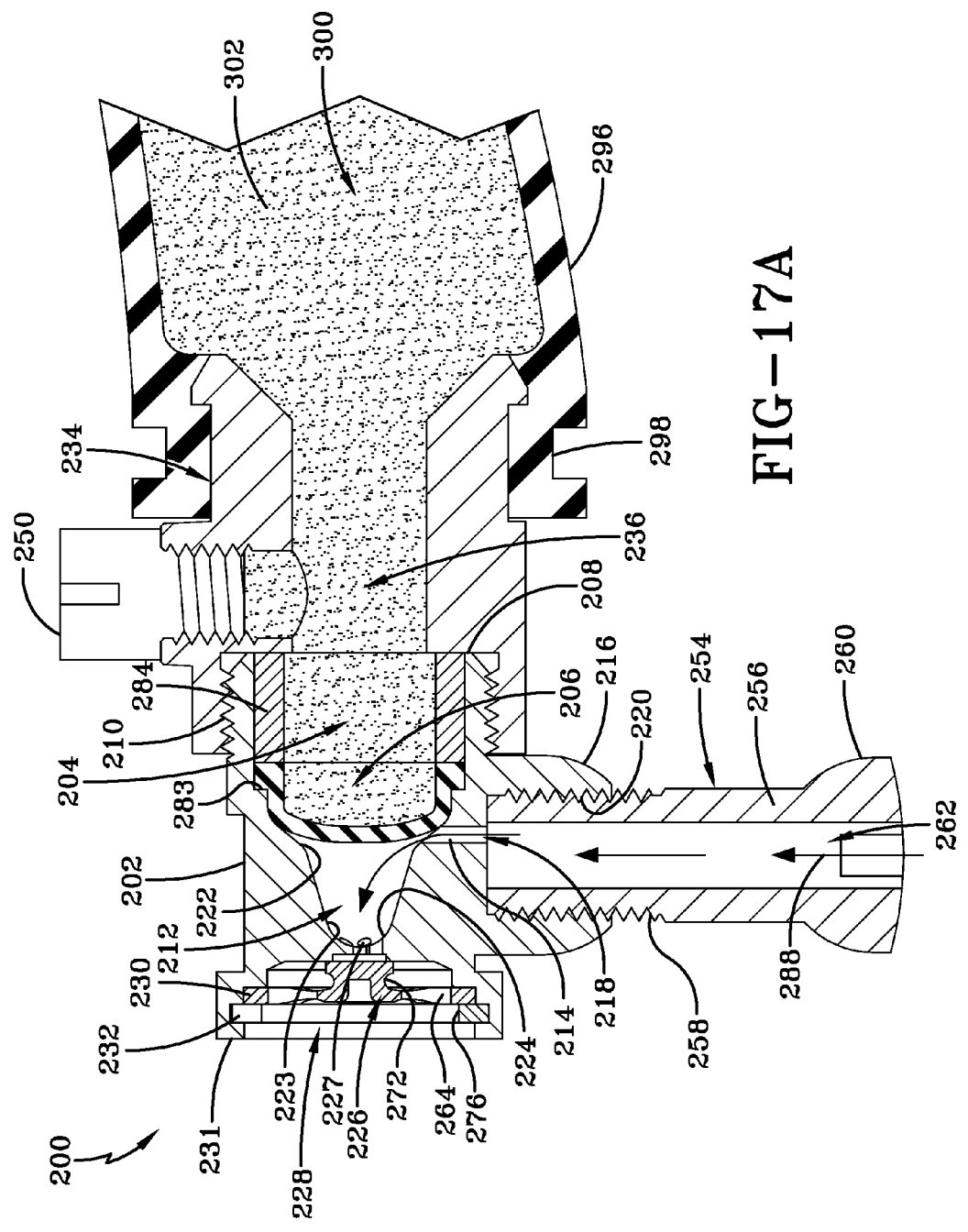
Figure 17B:
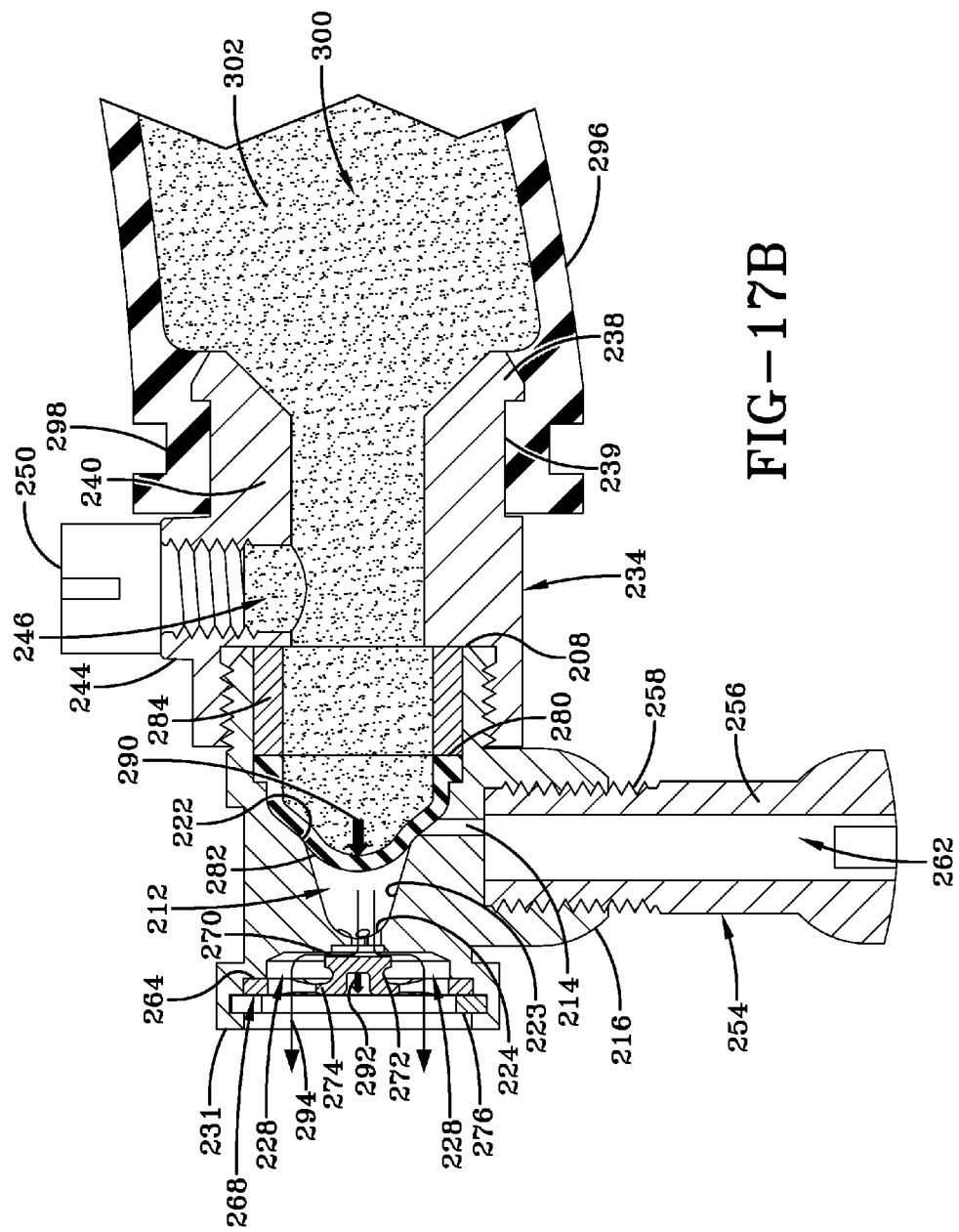
FIG. 17B is a view subsequent to FIG. 17A, showing a viscoelastic material filling the pump housing chamber and pushing the membrane valve member inward to seal off the inlet, and the pressurized air forcing the outlet valve plug member downward to open the outlet and release air to the tire cavity.
Figure 18A:
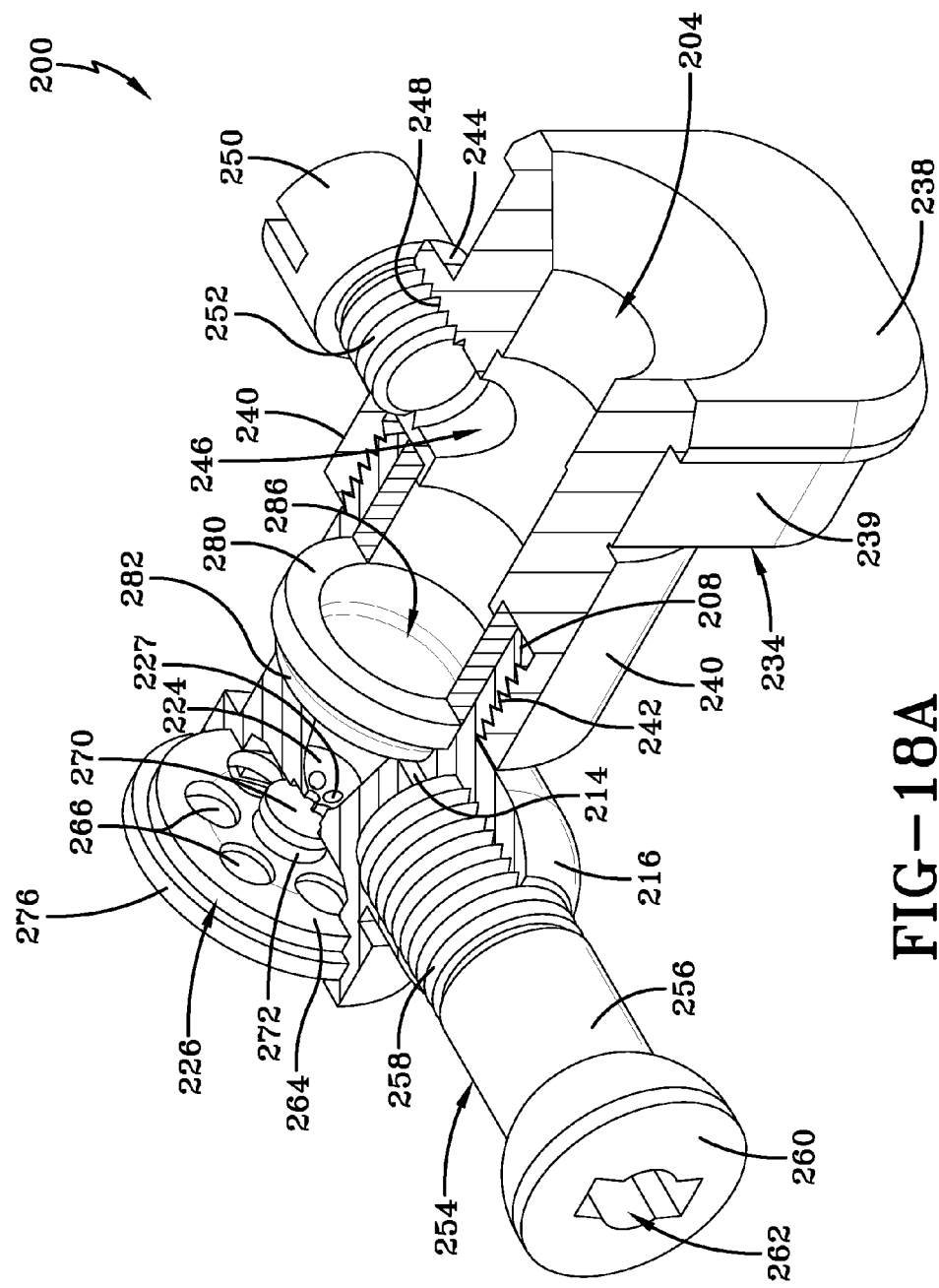
FIG. 18A is a sectioned isometric view of the pump assembly shown in FIG. 17A.
Figure 18B:
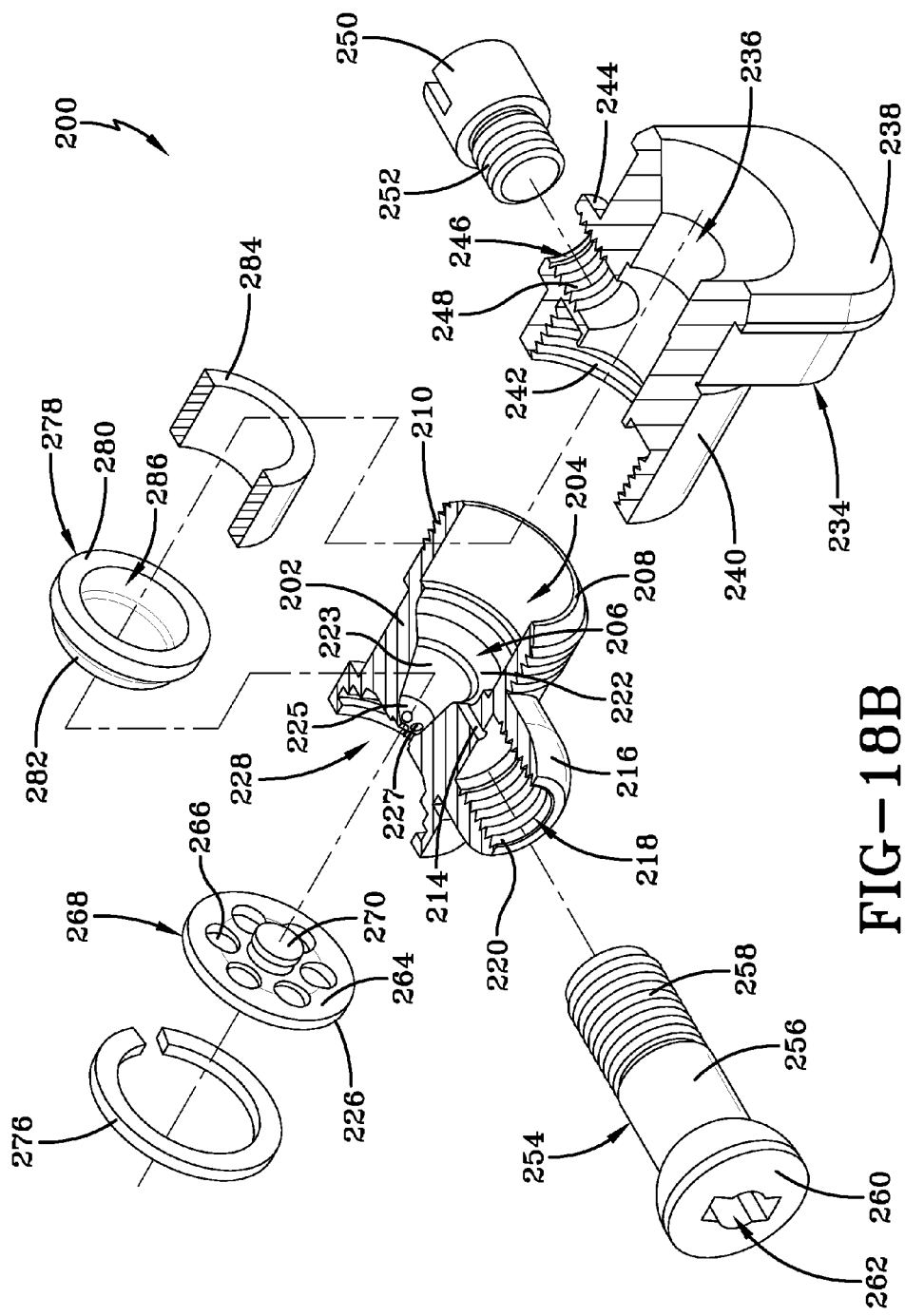
FIG. 18B is an exploded view of FIG. 18A.

As with the previously discussed example of FIGS. 2A and 7, the example tank-based pump assembly 200 as shown in FIGS. 17A and 17B attaches to an actuator tank or compression actuating body 296 by the means of a forward coupling rib 298 which engages into the detent channel 239 of the cap member 234. The compression actuating body 296 contains an internal reservoir 300 filled with a non-compressible medium 302 such as an anti-freeze and water mix. The forward outlet of the compression actuating body 296 thus is in fluid communication with the internal chamber 236 of the membrane panel 282 and the internal axial compression chamber 206.

FIGS. 15, 17A, 17B, and 18A illustrate the example pump assembly 200 in the assembled condition with the inlet tube 254 threadedly assembled into the inlet sleeve 216 of body 202; the outlet stop member 226 positioned within the outlet bore 228 against the apertures within end wall 224 of the chamber 212; and the retainer clip 276 in a retention position within the outlet bore 228. The compression actuating body or tank 296 is attached to the rearward end of the cap member 234 and filled with the medium 302 via fill port 244, after the screw member 250 is removed. The screw member 250 is then reinserted into the fill port 244 to encapsulate the medium 302 within the reservoir 300. In containment, the medium 302 fills the cap member chamber 236 and abuts against a rearward surface of membrane panel 282.

Figure 15:
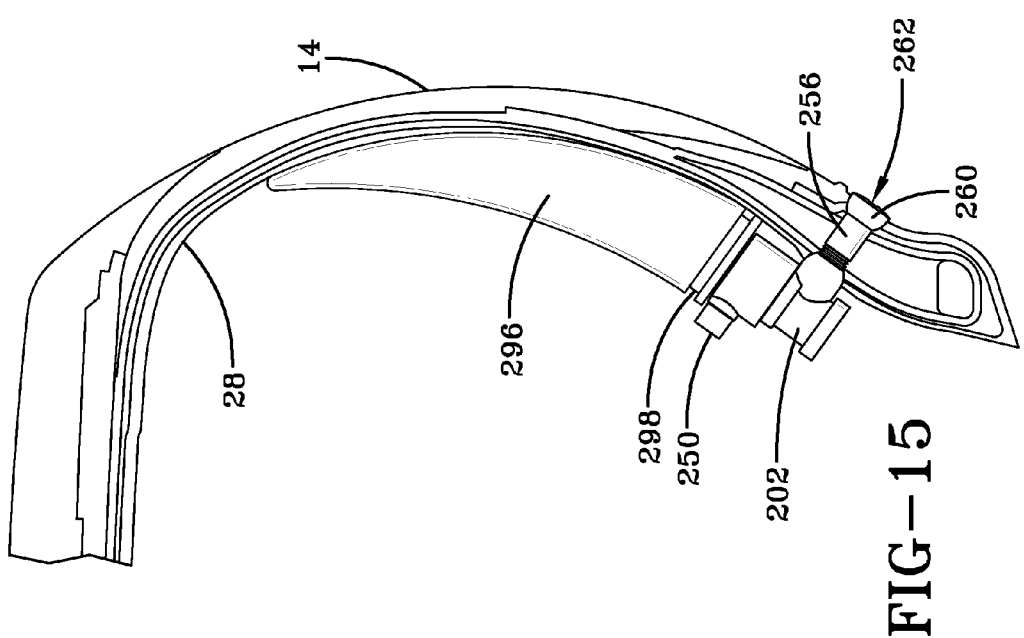
FIG. 15 is a sectioned view showing a modified version of a piston pump and compression actuator assembly attached to a tire innerliner.

The example assembly 200 with the compression actuating body 296 affixed to the inner liner 28 of a tire 12 is shown in FIG. 15. The inlet tube 254 extends through the tire sidewall 14 and presents the outer end of throughbore 262 to the atmosphere. The outlet bore 228 exits into the tire cavity 30 to direct replenishment air into the cavity as required.

FIG. 17A shows the example pump assembly 200 in an at-rest condition, with outside air entering the inlet chamber 262 as indicated by arrows 288. The membrane or diaphragm panel 282 of the membrane body 280 is in an at-rest, non-extended state in which the medium 302, behind the membrane panel 282, exerts only a nominal pressure against the panel. So positioned, the membrane panel 282 does not block the inlet of air from the inlet channel 214 into the compression chamber 212. In the at-rest position of FIG. 17A, air within the compression chamber 212 is in a non-compressed state. The sealing disk 270 of the plug member 268 is positioned against the concave end wall 224 of the compression chamber 212 and, so positioned, obstructs air from exiting the chamber 212 through the apertures 227. Air is thus contained in a non-compressed state within the chamber 212. In the at-rest condition, accordingly, the pump assembly 200 is not pumping air into the tire cavity 30.

FIG. 17B is a view subsequent, or prior, to FIG. 17A, wherein a deformation of the compression actuating body 296 acts to displace a quantity of the viscoelastic medium 302 under pressure through the internal chamber 236, the retention collar bore 204, and against a rearward surface of the membrane panel 282. The applied pressure from the displaced medium 302 against the membrane panel 282 forces the panel outward into a protruding or bulging condition as indicated by arrow 290. As a result, the air within the compression chamber 212 is compressed. Increased air pressure within the compression chamber 212 forces the sealing disk 270 of the plug member 268 outward, placing the plug member 268 into a state of compression against the support members 274.

Movement of the sealing disk 270 into the open position serves to uncover the apertures 227 and allow air to pass from the compression chamber 212, through the apertures 266 of the snap-ring 264, through the outlet bore 228, and into the tire cavity 30. It will further be noted that the bulging protrusion of the membrane panel 282 further acts to block off the inlet channel 214 during the cyclic pumping operation.

When the air pressure within the compression chamber 212 has diminished, the compression of plug member 268 releases and forces the sealing disk 270 back into the "sealing" or "closed" position of FIG. 17A. The membrane panel 282 resumes the configuration of FIG. 17A as the medium 302 behind the membrane panel recedes back into the containment reservoir 300 and the containment body 296 resumes its non-deformed configuration. Movement of the membrane panel 282 back into a "non-protruding" configuration opens the inlet channel 214, thus allowing outside air to be admitted into the compression chamber 212. This cyclical intake of air, compression of air, and exhausting of compressed air into the tire cavity 30 occurs with every tire revolution.

The sealing disk 270 may be formed of plastic and have a minimal travel to open, such as, but not limited to, 0.010 inches to 0.020 inches. When assembled to the snap-ring 264, the sealing disk 270 force the seal against the openings 227 in the compression chamber 212. The six holes 266 through the snap-ring 264 operate to move a large amount of air from the compression chamber 212 to the tire cavity 30 during tire rotation.

Figure 19A:
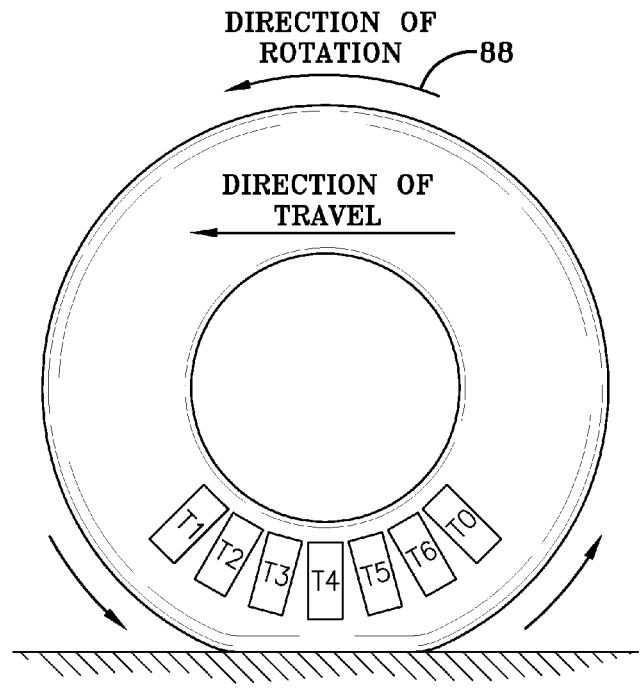
FIG. 19A is a schematic view of a rolling tire showing sequential positioning of the pumping assembly as the tire rotates.
Figure 19B:
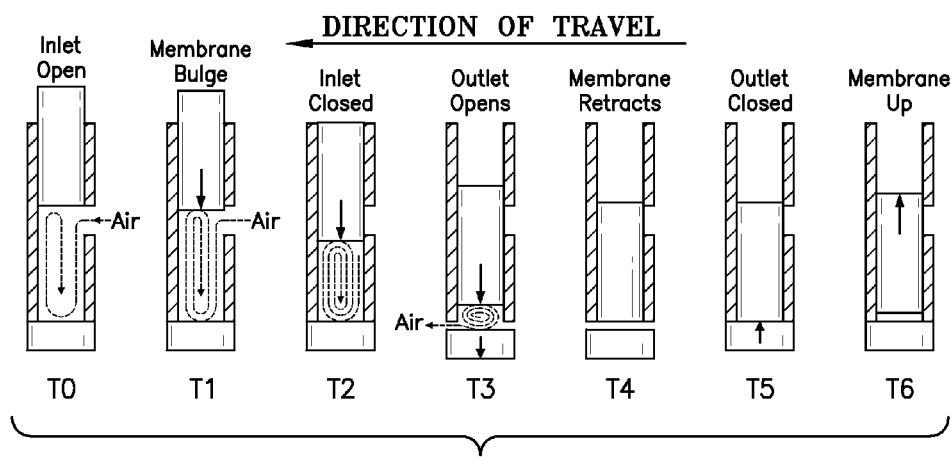
FIG. 19B is a diagrammatic view showing the pump operation at the sequential positions of FIG. 19A.
Figure 20:
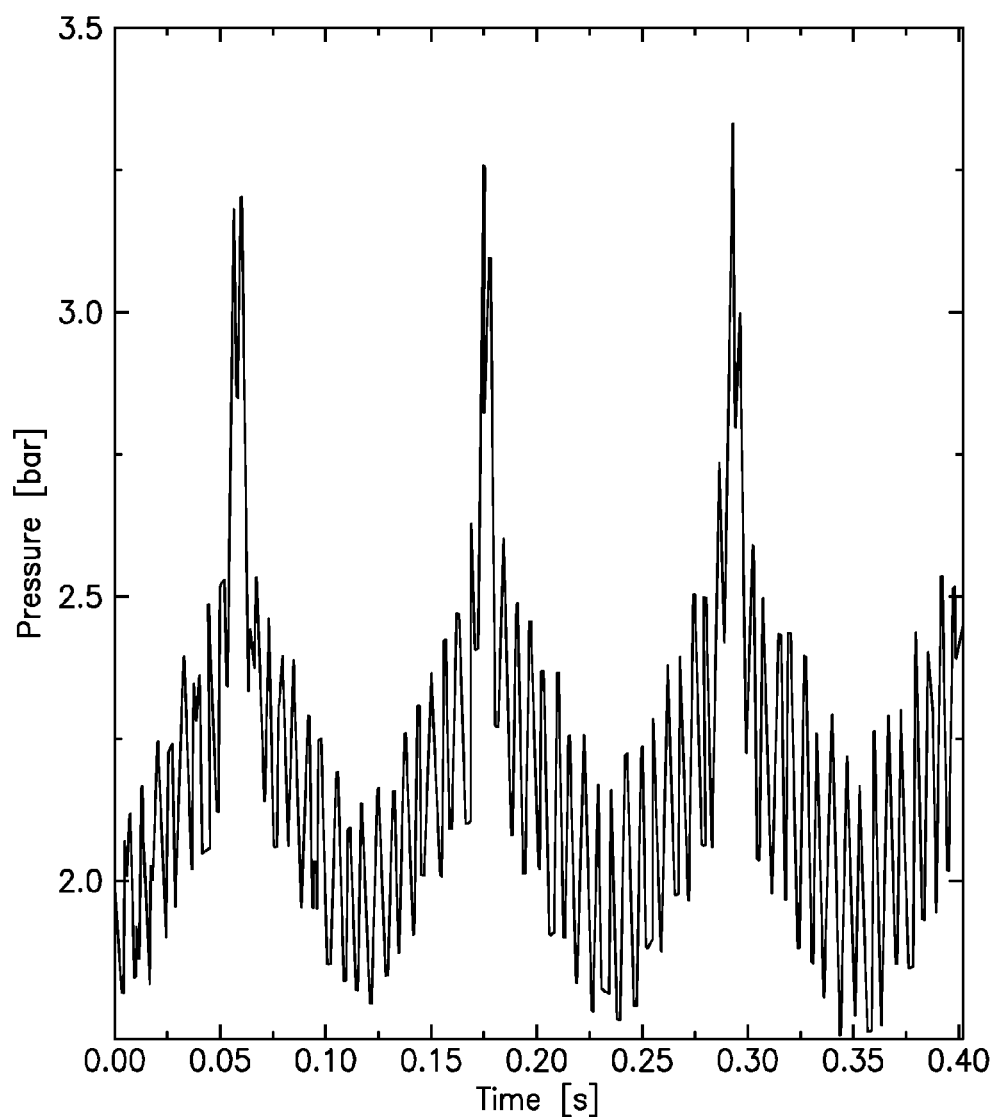
FIG. 20 is a graph of pumping air pressure over a time interval as a tire rotates.

FIGS. 17A, 17B, 19A, and 19B show the operational cycle of the example pump assembly 200 as a tire 12 rotates against a road surface 34. The flexing of the tire sidewall 14 causes a deformation of the compression actuating body 286 as the body enters a position adjacent the tire footprint 38. Stages T1-T0 in FIG. 19A show positions of the pump assembly 200 entering and leaving the proximity of the tire footprint 38. FIG. 19B shows the operation/location of the membrane panel 282 at each of the stages T1-T0. The example pump assembly 200 accordingly closes and opens inlet and outlet ports to effect pressurized air replenishment of the tire 12 during rotational operation of the tire. FIG. 20 shows, in graphic form, the cyclical pressure level variance within the compression chamber 212 over time.

Figure 21:
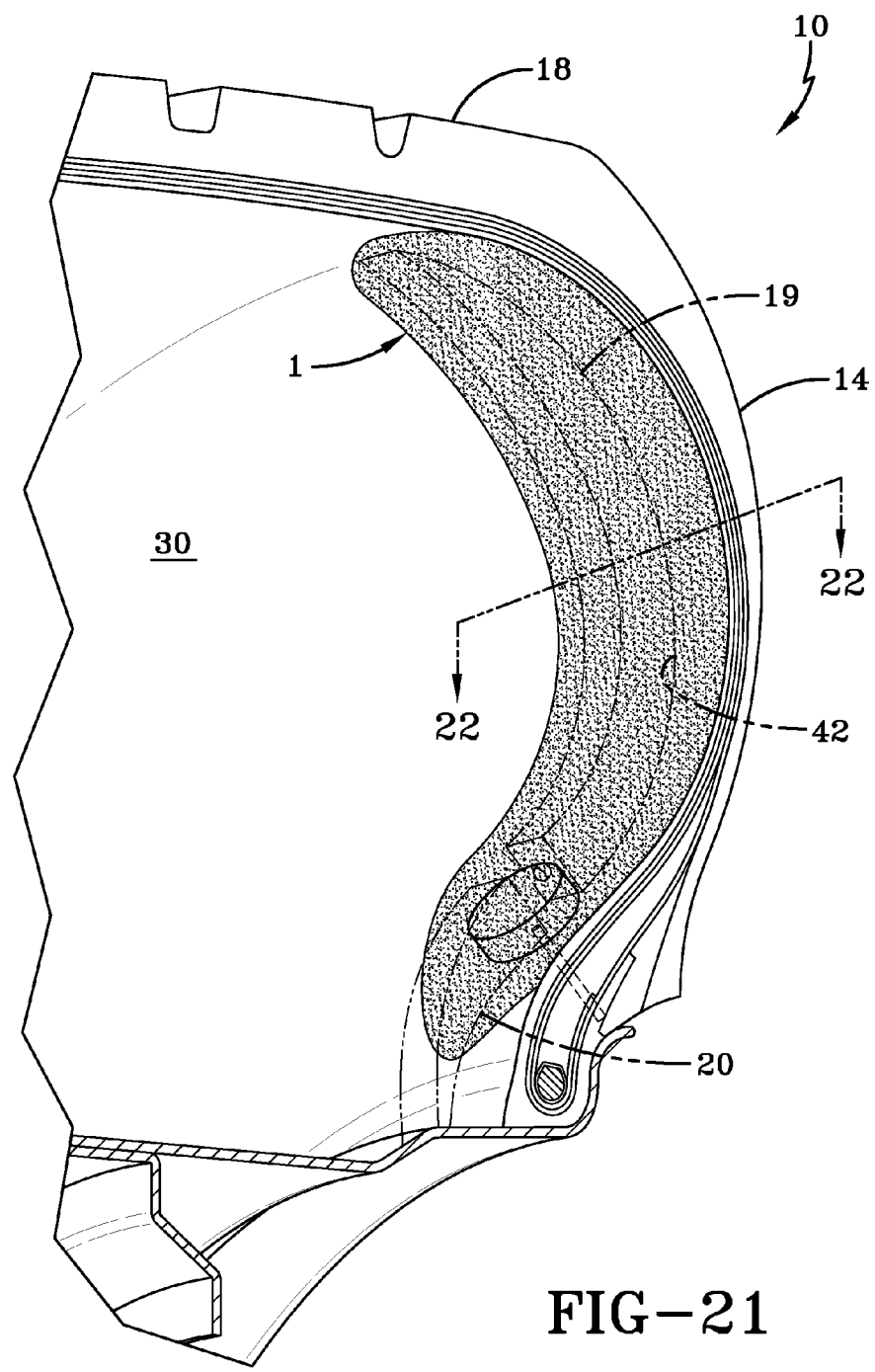
FIG. 21 is an example schematic view taken along line 4-4 in FIG. 3A of a protective structure in accordance with the present invention.
Figure 22:
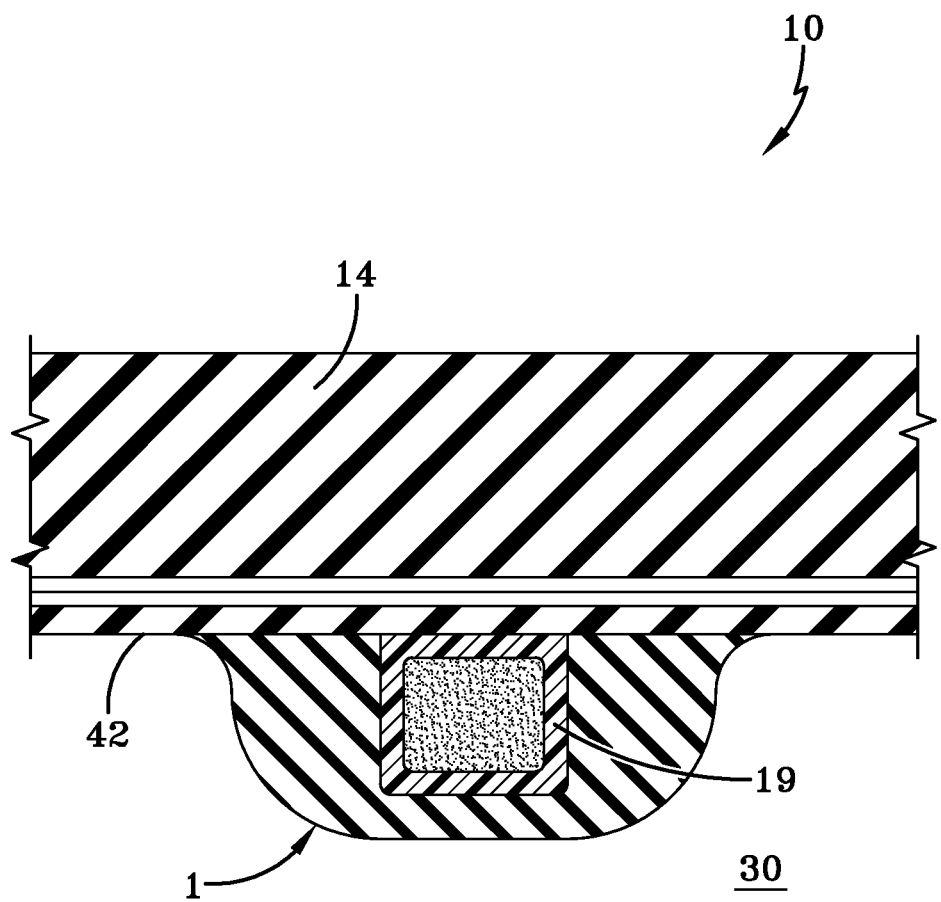
FIG. 22 is a sectioned view taken along line 22-22 in FIG. 21.

During the retreading process of a commercial truck tire, such as the example tire 12, a bladder is inflated and heated inside the tire cavity 30. There is a potential for the bladder to be damaged by the structure(s) described above, such as 19, 20, 168, 200, etc., or the bladder to damage the structure (s) described above, such as 19, 20, 168, 200, etc., in such a commercial truck tire 12. In order to protect the bladder and the structure(s), such as 19, 20, 168, 200, etc., during retreading, in accordance with the present invention, a contoured piece 1 made of insulating material may be placed over the structure(s), such as 19, 20, 168, 200, etc., during the retreading process (FIGS. 21-22). The insulated material may be a foamed material, a polystyrene foam, silicone, aramid, or other suitable insulating material. This contoured piece 1 may thus protect the structure(s), such as 19, 20, 168, 200, etc., from heat and localized forces and protect the bladder from sharp edges and localized forces. This may allow the structure(s), such as 19, 20, 168, 200, etc., of an air maintenance system to remain attached to the inside of a tire 12 during retreading with no damage to the structure(s), such as 19, 20, 168, 200, etc., or the bladder.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed:

1. A method for retreading an air-maintenance tire comprising the steps of:
   grinding remaining tread material from the tire casing of a worn air-maintenance tire;
   temporarily securing an aramid contoured piece around a structure secured to the inner surface of the tire casing;
   placing a tread on the tire casing;
   inflating a bladder within an internal cavity of the tire casing and around the contoured piece whereby the bladder does not contact the structure;
   securing the tread to the tire casing including the step of the bladder providing heat to the tire casing;
   deflating the bladder;
   separating the tire casing and tread secured to the tire casing from the bladder; and
   removing the contoured piece from the tire casing thereby forming a retreaded air-maintenance tire.

2. The method as set forth in claim 1 wherein the internal cavity is defined by an innerliner of the tire casing and the structure is secured to the innerliner.

3. The method as set forth in claim 1 wherein the structure includes a pressure regulator mounted to the tire casing and being operatively actuated by deformation of the retreaded tire casing.

4. The method as set forth in claim 1 wherein the structure includes a pump assembly affixed to the tire casing.

5. The method as set forth in claim 1 wherein the structure includes a pressure pressure regulator body affixed to the tire casing, the compressor body including an internal air chamber with an inlet opening for admitting air into the internal air chamber and an outlet opening for conducting air from the internal air chamber to the internal cavity of the tire casing.

6. The method as set forth in claim 1 wherein the structure includes a flexible membrane member located within an air chamber and operatively deforming within the air chamber responsive to contacting engagement with a compression actuator means between an open position relative to an inlet opening permitting air flow from the inlet opening into the air chamber and a closed position relative to the inlet opening obstructing air flow from the inlet opening into the air chamber.

7. The method as set forth in claim 1 wherein the structure includes a membrane member operatively deforming between an open position and a closed position thereby compressing a volume of air within an air chamber.

8. A system for retreading an air maintenance tire comprising:
   a tire casing of a worn air maintenance tire, the tire casing having remaining tread material ground off the tire casing;
   an aramid contoured piece temporarily secured around a structure secured to the inner surface of the tire casing;
   a retread element placed on the ground off tire casing; and
   a bladder adapted to a) be inflated within an internal cavity of the tire casing and around the contoured piece whereby the bladder does not contact the structure, b) provide heat for securing the retread element to the tire casing, and c) be subsequently deflated and separated from the tire casing thus allowing the contoured piece to be removed from the tire casing.

9. The system as set forth in claim 8 wherein the internal cavity is defined by an innerliner of the tire casing and the structure is secured to the innerliner.

10. The system as set forth in claim 8 wherein the structure includes a pressure regulator mounted to the tire casing and being operatively actuated by deformation of the retreaded tire casing.

11. The system as set forth in claim 8 wherein the structure includes a pump assembly affixed to the tire casing.

12. The system as set forth in claim 8 wherein the structure includes a pressure regulator body affixed to the tire casing, the pressure regulator body including an internal air chamber with an inlet opening for admitting air into the internal air chamber and an outlet opening for conducting air from the internal air chamber to the internal cavity of the tire casing.

13. The system as set forth in claim 8 wherein the structure includes a flexible membrane member located within an air chamber and operatively deforming within the air chamber responsive to contacting engagement with a compression actuator means between an open position relative to an inlet opening permitting air flow from the inlet opening into the air chamber and a closed position relative to the inlet opening obstructing air flow from the inlet opening into the air chamber.

14. The system as set forth in claim 8 wherein the structure includes a membrane member operatively deforming between an open position and a closed position thereby compressing a volume of air within an air chamber.

\* \* \* \* \*